(12) United States Patent
Kobayashi

(10) Patent No.: US 11,941,672 B2
(45) Date of Patent: Mar. 26, 2024

(54) INFORMATION PROCESSING SYSTEM, INFORMATION PROCESSING METHOD, AND NON-TRANSITORY RECORDING MEDIUM

(71) Applicant: Hiroshi Kobayashi, Kanagawa (JP)

(72) Inventor: Hiroshi Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 247 days.

(21) Appl. No.: 17/074,744

(22) Filed: Oct. 20, 2020

(65) Prior Publication Data

US 2021/0166284 A1 Jun. 3, 2021

(30) Foreign Application Priority Data

Nov. 29, 2019 (JP) ................. 2019-216252

(51) Int. Cl.
*G06Q 30/04* (2012.01)
*G06F 3/12* (2006.01)
*G06F 40/106* (2020.01)

(52) U.S. Cl.
CPC ........... *G06Q 30/04* (2013.01); *G06F 3/1203* (2013.01); *G06F 3/1243* (2013.01); *G06F 40/106* (2020.01)

(58) Field of Classification Search
None
See application file for complete search history.

(56) References Cited

U.S. PATENT DOCUMENTS

| | | | | |
|---|---|---|---|---|
| 6,826,542 B1* | 11/2004 | Virgin | ................... | G06Q 40/08 705/40 |
| 9,916,606 B2* | 3/2018 | Stroh | ..................... | G06Q 30/04 |
| 2009/0043689 A1* | 2/2009 | Yang | ................... | G06Q 40/025 705/38 |
| 2012/0290453 A1* | 11/2012 | Manista | ................ | G06Q 40/12 705/30 |
| 2015/0172603 A1* | 6/2015 | Gorodetski | .......... | G06V 30/224 348/61 |
| 2019/0034421 A1* | 1/2019 | Teshima | .................. | G06F 16/23 |
| 2020/0026950 A1 | 1/2020 | Kobayashi et al. | | |

FOREIGN PATENT DOCUMENTS

JP 2016-051339 4/2016

OTHER PUBLICATIONS

Hua, et al., "A Brief Review of Machine Learning and its Application", 2009, Information Engineering Institute Capital Normal University, entire document pertinent (Year: 2009).*

* cited by examiner

*Primary Examiner* — Paul S Schwarzenberg
(74) *Attorney, Agent, or Firm* — IPUSA, PLLC

(57) ABSTRACT

An information processing system includes at least one information processing apparatus. The information processing system includes circuitry that outputs a list of ledger sheet management information items to a terminal apparatus. Each of the ledger sheet management information items is extracted from a ledger sheet recognition result of ledger sheet recognition executed on ledger sheet image data of a ledger sheet. Based on a combination of ledger sheet management information items included in the list of ledger sheet management information items and identified as meeting a certain condition, the circuitry causes the terminal apparatus to display a preview screen including respective preview images of a plurality of ledger sheet images corresponding to the ledger sheet management information items included in the combination of ledger sheet management information items.

16 Claims, 27 Drawing Sheets

FIG. 5

| ITEM ID | ITEM NAME | DIRECTION | DISTANCE (RIGHT) | DISTANCE (LEFT) |
|---|---|---|---|---|
| 1 | | | | |
| 2 | TOTAL SUM | RD | | |
| 3 | SUBTOTAL | R | | |
| 4 | INVOICE NUMBER:; INVOICE NO. | R | | |
| 5 | | | | |
| 6 | CODE; ARTICLE CODE; PRODUCT NUMBER | D | | |
| 7 | ITEM NAME; ARTICLE NAME; PRODUCT NAME | D | | |
| 8 | QUANTITY | D | | |
| 9 | AMOUNT | D | | |
| 10 | UNIT PRICE | D | | |
| 11 | PRICE; PRICE (TAX EXCLUDED) | D | | |
| 12 | PAYEE ACCOUNT; BANK NAME:; BANK NAME, BANK NAME, BANK NAME: | R | | |
| 13 | BRANCH NAME, BRANCH NAME, BRANCH NAME, BRANCH NAME, BRANCH NAME: | R | | |
| 14 | ACCOUNT; ACCOUNT TYPE | R | | |
| 15 | ACCOUNT NUMBER; ACCOUNT NO. | R | | |
| 16 | NAME ON ACCOUNT | R | | |
| 17 | PAYMENT DUE DATE | R | | |

240

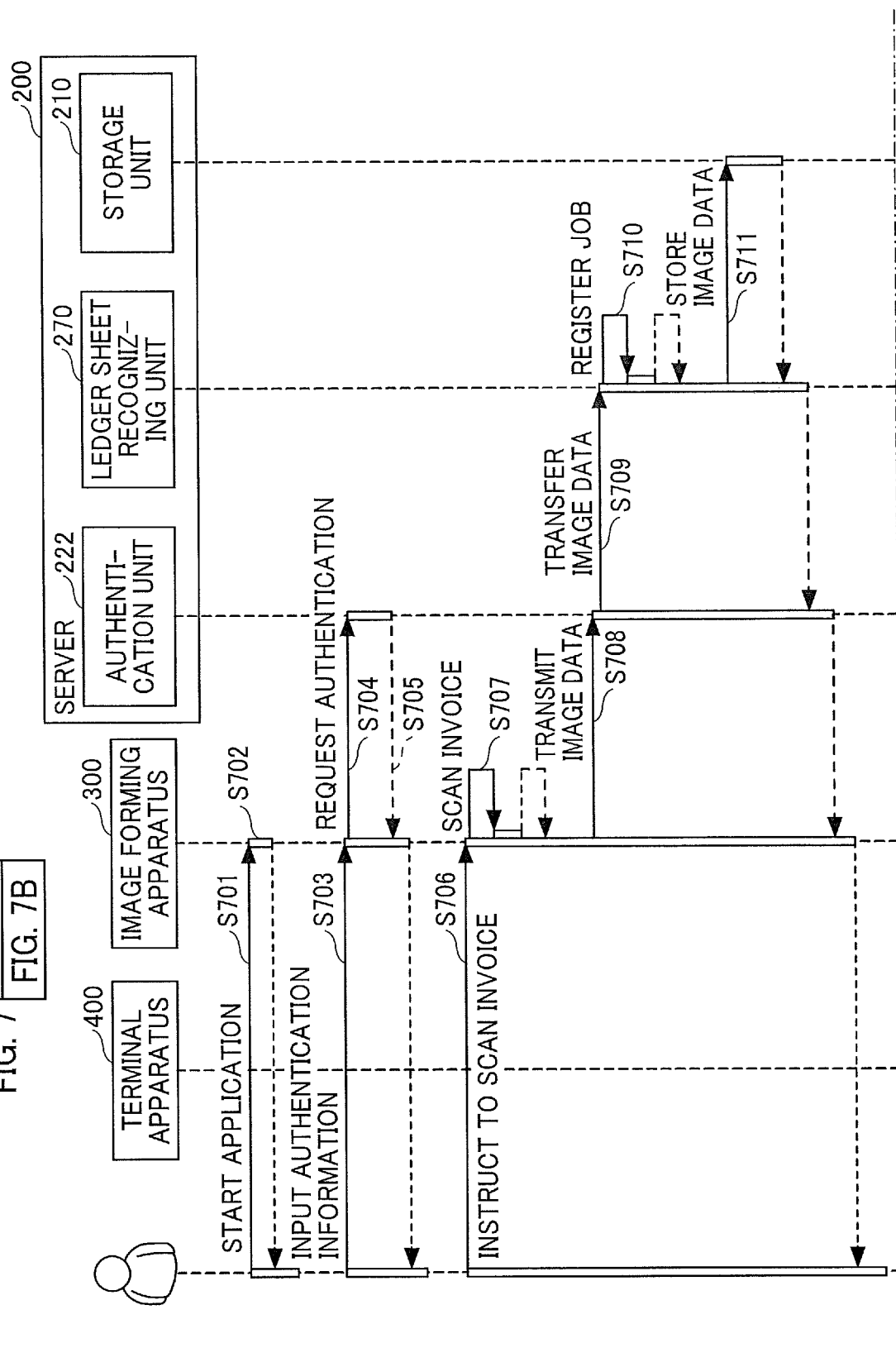

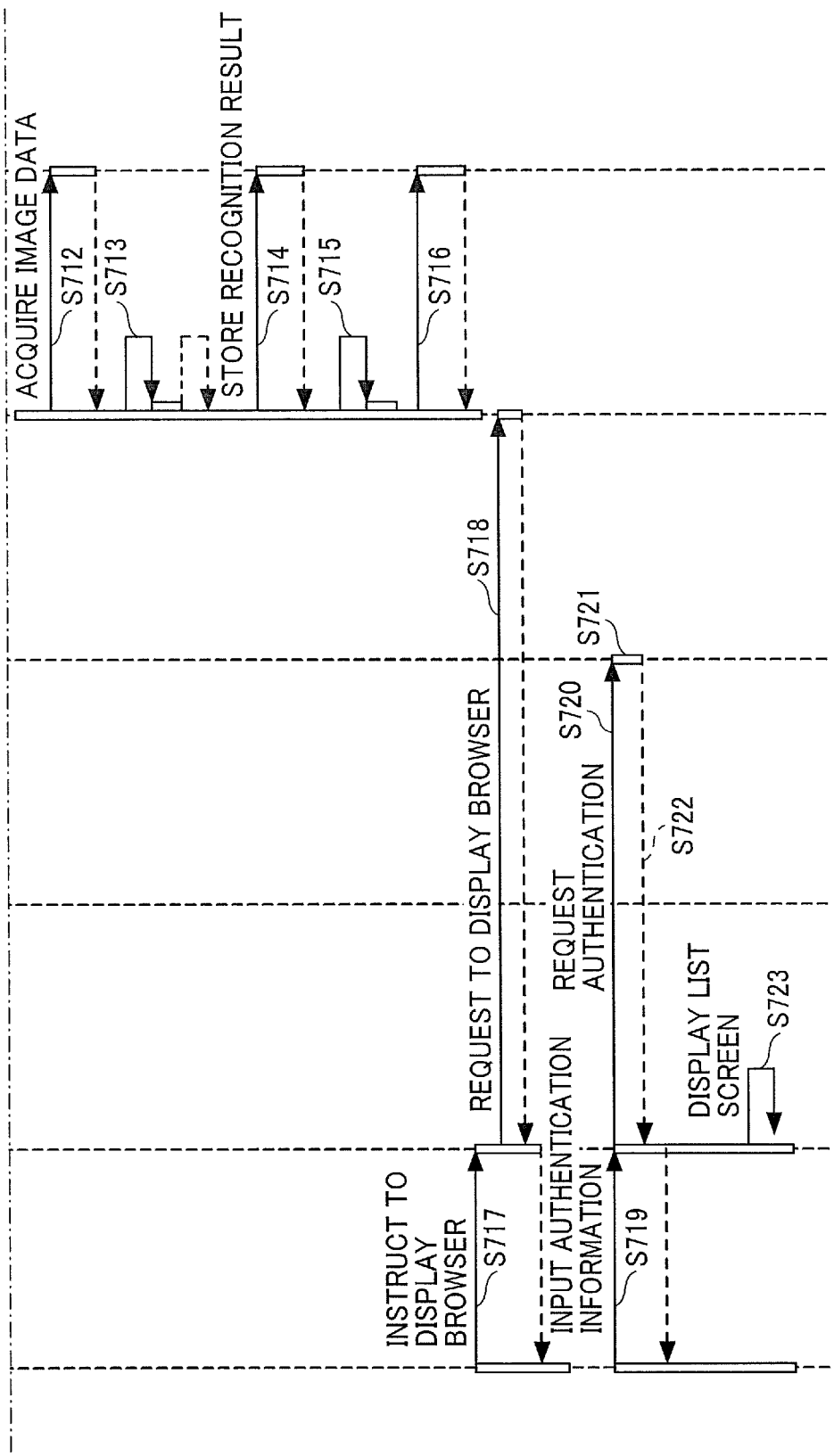

FIG. 9

| JOB ID | USER ID | LEDGER SHEET IMAGE FILE PATH | RECOGNITION RESULT FILE PATH | STATUS | DEFINITION ID |
|---|---|---|---|---|---|
| J1 | A123 | XXX | YYYY | CONFIRMED | H01, A01 |
| J2 | B111 | XXY | ... | ... | S01 |
| .. | .. | .. | ... | ... | ... |

| ID | X COOR-DINATE | Y COOR-DINATE | WIDTH OF CHARACTER | HEIGHT OF CHARACTER | DEGREE OF CERTAINTY | CHARACTER |
|---|---|---|---|---|---|---|
| 73 | 385 | 552 | 77 | 45 | 99 | COMPANY A |
| 74 | 363 | 552 | 76 | 42 | 99 | |
| ...... | | | | | | |
| 76 | 958 | 553 | 19 | 32 | 98 | IN-VOICE ISSUER |
| 77 | 990 | 552 | 32 | 28 | 99 | |
| 78 | 1018 | 549 | 28 | 27 | 99 | |
| 79 | 1040 | 551 | 22 | 28 | 99 | |
| ...... | | | | | | |
| 98 | 385 | 606 | 77 | 37 | 98 | A |
| ...... | | | | | | |
| 99 | 958 | 606 | 14 | 37 | 98 | 3 |
| 100 | 972 | 613 | 15 | 23 | 99 | 0 |
| 101 | 987 | 614 | 15 | 20 | 99 | 0 |
| 102 | 1002 | 613 | 11 | 26 | 99 | , |
| 103 | 1013 | 615 | 15 | 27 | 99 | 0 |
| 104 | 1028 | 607 | 13 | 35 | 99 | 0 |
| 105 | 1042 | 609 | 14 | 32 | 99 | 0 |
| ...... | | | | | | |

152

| ID | X COOR-DINATE | Y COOR-DINATE | WIDTH OF KEYWORD | HEIGHT OF KEYWORD | KEYWORD |
|---|---|---|---|---|---|
| 17 | 363 | 552 | 153 | 45 | COMPANY CA |
| 22 | 985 | 553 | 98 | 32 | INVOICE ISSUER |
| 36 | 358 | 606 | 350 | 37 | A |
| 41 | 958 | 606 | 84 | 15 | 300,000 |

153

| CELL ID | X COOR-DINATE | Y COOR-DINATE | WIDTH OF CELL | HEIGHT OF CELL | KEYWORD |
|---|---|---|---|---|---|
| 2 | 355 | 532 | 221 | 82 | COMPANY CA |
| 7 | 955 | 532 | 380 | 82 | INVOICE ISSUER |
| 9 | 355 | 619 | 221 | 80 | ⋮ |

154

| INVOICE ISSUER | COMPANY CA |
|---|---|
| DATE OF INVOICE | 2019/09/03 |
| ⋮ | ⋮ |

| ID | INVOICE ISSUER | BILLING AMOUNT | DATE OF INVOICE | DATE AND TIME OF REGISTRATION | STATUS | TOTAL ITEM PRICE | IMAGE FILE PATH | INVOICE NUMBER | ITEM INFORMATION |
|---|---|---|---|---|---|---|---|---|---|
| 1 | COMPANY CA | 54,000 | 2019/09/03 | 2019/09/25 13:20:01 | UNPROCESSED | 38,200 | file://..... | | 1. RECEPTION TABLE: aaa YEN<br>2. :<br>3. :<br>4. :<br>5. : |
| 2 | COMPANY CA | 35,600 | 2019/09/05 | 2019/09/23 10:31:12 | CONFIRMED | 35,600 | file://..... | | |
| 3 | COMPANY CB | 12,800 | 2019/09/08 | 2019/09/22 15:28:26 | UNPROCESSED | 0 | file://..... | | |
| 4 | COMPANY CA | 0 | 2019/09/03 | 2019/09/25 13:20:01 | UNPROCESSED | 15,800 | file://..... | | |
| 5 | COMPANY CB | 12,800 | 2019/09/08 | 2019/09/22 15:28:26 | UNPROCESSED | 0 | | | |
| 6 | COMPANY CA | 11,000 | 2019/09/05 | 2019/09/23 10:31:12 | UNPROCESSED | 11,000 | file://..... | | |

FIG. 13

< LEDGER SHEET LIST      ⊙ Ken Suzuki ▾

LEDGER SHEET SEARCH

| INVOICE ISSUER ≑ | SEARCH 🔍 | | DATE OF REGISTRATION |
|---|---|---|---|
| ☐ UNPROCESSED | ☐ LEDGER SHEET IDENTIFICATION FAILED | | YEAR/MONTH/DAY 📅 − YEAR/MONTH/DAY 📅 |
| ☐ SAVED AS DRAFT | ☐ OUTPUT TO CSV | ☐ CONFIRMED | |

🔍 SEARCH

1558 RESULTS

⬇ DOWNLOAD CSV | COMBINE LEDGER SHEETS — 133

| | INVOICE ISSUER | BILLING AMOUNT (TAX INCLUDED) | DATE OF INVOICE | DATE AND TIME OF REGISTRATION | STATUS |
|---|---|---|---|---|---|
| ☐ | COMPANY CA | 54,000 | 2019/09/03 | 2019/09/25 13:20:01 | UNPROCESSED |
| ☑ | COMPANY CA | 35,600 | 2019/09/05 | 2019/09/20 16:31:12 | CONFIRMED |
| ☐ | COMPANY CB | 12,800 | 2019/09/08 | 2019/09/22 16:28:26 | UNPROCESSED |
| ☐ | COMPANY CA | 0 | 2019/09/03 | 2019/09/25 13:20:01 | UNPROCESSED |
| ☐ | COMPANY CB | 12,800 | 2019/09/08 | 2019/09/22 15:28:26 | UNPROCESSED |
| ☐ | COMPANY CA | 11,000 | 2019/09/05 | 2019/09/23 10:31:12 | UNPROCESSED |

10 ≑ HITS

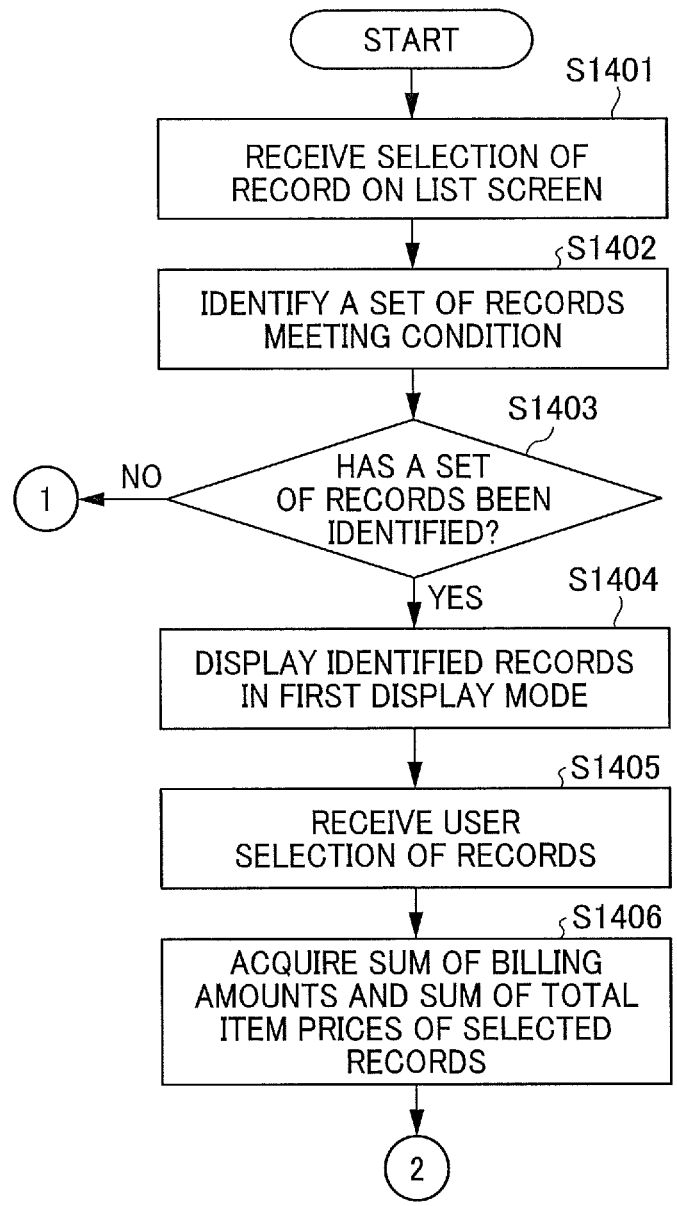

FIG. 15

| | INVOICE ISSUER | BILLING AMOUNT (TAX INCLUDED) | DATE OF INVOICE | DATE AND TIME OF REGISTRATION | STATUS |
|---|---|---|---|---|---|
| ☑ | COMPANY CA | 54,000 | 2019/09/03 | 2019/09/25 13:20:01 | UNPROCESSED |
| ☑ | COMPANY CA | 35,600 | 2019/09/05 | 2019/09/20 16:31:12 | CONFIRMED |
| ☐ | COMPANY CB | 12,800 | 2019/09/08 | 2019/09/22 16:28:26 | UNPROCESSED |
| ☐ | COMPANY CA | 0 | 2019/09/03 | 2019/09/25 13:20:01 | UNPROCESSED |
| ☐ | COMPANY CB | 12,800 | 2019/09/08 | 2019/09/22 15:28:26 | UNPROCESSED |
| ☐ | COMPANY CA | 11,000 | 2019/09/05 | 2019/09/23 10:31:12 | UNPROCESSED |

< LEDGER SHEET LIST

Ⓠ Ken Suzuki ▾

LEDGER SHEET SEARCH

INVOICE ISSUER ⇕ | SEARCH    🔍    DATE OF REGISTRATION  YEAR/MONTH/DAY 📅 — YEAR/MONTH/DAY 📅

☐ UNPROCESSED   ☐ LEDGER SHEET IDENTIFICATION FAILED
☐ SAVED AS DRAFT   ☐ OUTPUT TO CSV   ☐ CONFIRMED

🔍 SEARCH

1558 RESULTS

⬇ DOWNLOAD CSV    COMBINE LEDGER SHEETS —133

10 ⇕ HITS —132

< LEDGER SHEET LIST       ⓒ Ken Suzuki ▾

LEDGER SHEET SEARCH

| INVOICE ISSUER ⇅ | SEARCH | 🔍 | | DATE OF REGISTRATION |
|---|---|---|---|---|
| ☐ UNPROCESSED | ☐ LEDGER SHEET IDENTIFICATION FAILED | | | YEAR/MONTH/DAY 📅 – YEAR/MONTH/DAY 📅 |
| ☐ SAVED AS DRAFT | ☐ OUTPUT TO CSV | ☐ CONFIRMED | | |

🔍 SEARCH

1558 RESULTS

⬇ DOWNLOAD CSV   COMBINE LEDGER SHEETS — 133

10 ⇅ HITS

| | INVOICE ISSUER | BILLING AMOUNT (TAX INCLUDED) | DATE OF INVOICE | DATE AND TIME OF REGISTRATION | STATUS |
|---|---|---|---|---|---|
| ☐ | COMPANY CA | 54,000 | 2019/09/03 | 2019/09/25 13:20:01 | UNPROCESSED |
| ☐ | COMPANY CA | 35,600 | 2019/09/05 | 2019/09/20 16:31:12 | CONFIRMED |
| ☐ | COMPANY CB | 12,800 | 2019/09/08 | 2019/09/22 16:28:26 | UNPROCESSED |
| ☐ | COMPANY CA | 0 | 2019/09/03 | 2019/09/25 13:20:01 | UNPROCESSED |
| ☐ | COMPANY CB | 12,800 | 2019/09/08 | 2019/09/22 15:28:26 | UNPROCESSED |
| ☐ | COMPANY CA | 11,000 | 2019/09/05 | 2019/09/23 10:31:12 | UNPROCESSED |

< LEDGER SHEET LIST

⊙ Ken Suzuki ▾

LEDGER SHEET SEARCH

| INVOICE ISSUER ⇕ | SEARCH 🔍 |
| ☐ UNPROCESSED | ☐ LEDGER SHEET IDENTIFICATION FAILED |
| ☐ SAVED AS DRAFT | ☐ OUTPUT TO CSV | ☐ CONFIRMED |

DATE OF REGISTRATION: [YEAR/MONTH/DAY 📅] − [YEAR/MONTH/DAY]

🔍 SEARCH

1558 RESULTS

⬇ DOWNLOAD CSV | COMBINE LEDGER SHEETS —133

10 ⇕ HITS

| | INVOICE ISSUER | BILLING AMOUNT (TAX INCLUDED) | DATE OF INVOICE | DATE AND TIME OF REGISTRATION | STATUS |
|---|---|---|---|---|---|
| ☑ | COMPANY CA | 54,000 | 2019/09/03 | 2019/09/25 13:20:01 | UNPROCESSED |
| ☑ | COMPANY CA | 35,600 | 2019/09/05 | 2019/09/20 16:31:12 | CONFIRMED |
| ☐ | COMPANY CA | 12,800 | 2019/09/08 | 2019/09/22 16:28:26 | UNPROCESSED |
| ☐ | COMPANY CA | 0 | 2019/09/03 | 2019/09/25 13:20:01 | UNPROCESSED |
| ☐ | COMPANY CB | 12,800 | 2019/09/08 | 2019/09/22 15:28:26 | UNPROCESSED |
| ☐ | COMPANY CA | 11,000 | 2019/09/05 | 2019/09/23 10:31:12 | UNPROCESSED |

| ID | INVOICE ISSUER | BILLING AMOUNT | DATE OF INVOICE | DATE AND TIME OF REGISTRATION | STATUS | TOTAL ITEM PRICE | IMAGE FILE PATH | INVOICE NUMBER | ITEM INFORMATION |
|---|---|---|---|---|---|---|---|---|---|
| 1 | COMPANY CA | 54,000 | 2019/09/03 | 2019/09/25 13:20:01 | COMBINED | 38,200 | file://·····/001 | | 1. RECEPTION TABLE: aaa YEN<br>2. ···<br>3. ···<br>4. ···<br>5. ··· |
| 2 | COMPANY CA | 35,600 | 2019/09/05 | 2019/09/23 10:31:12 | CONFIRMED | 35,600 | file://····· | | |
| 3 | COMPANY CB | 12,800 | 2019/09/08 | 2019/09/22 15:28:26 | UNPROCESSED | 0 | file://····· | | |
| 4 | COMPANY CA | 0 | 2019/09/03 | 2019/09/25 13:20:01 | COMBINED | 15,800 | file://·····/002 | | 1.bbb<br>2.ccc |
| 5 | COMPANY CB | 12,800 | 2019/09/08 | 2019/09/22 15:28:26 | UNPROCESSED | 0 | file://····· | | |
| 6 | COMPANY CA | 11,000 | 2019/09/05 | 2019/09/23 10:31:12 | UNPROCESSED | 11,000 | file://····· | | |
| 7 | COMPANY CA | 54,000 | 2019/09/03 | 2019/09/26 09:00:02 | COMBINING RESULT (IDS: 1, 4) UNPROCESSED | 54,000 | file://·····<br>OR<br>·file://·····/001<br>·file://·····/002 | | 1.RECEPTION TABLE<br>2. ···<br>3. ···<br>4. ···<br>5. ···<br>6.bbb<br>7.ccc |

FIG. 21

LEDGER SHEET LIST                                                                 Ken Suzuki ▾

LEDGER SHEET SEARCH

INVOICE ISSUER ⬍ | SEARCH                              DATE OF
                                                       REGISTRATION
☐ UNPROCESSED  ☐ LEDGER SHEET IDENTIFICATION FAILED    YEAR/MONTH 📅 - YEAR/MONTH 📅
☐ SAVED AS DRAFT  ☐ OUTPUT TO CSV  ☐ CONFIRMED              /DAY              /DAY

🔍 SEARCH

1558 RESULTS

⬇ DOWNLOAD CSV  COMBINE LEDGER SHEETS ~133                                    10 ⬍ HITS

| ☐ | INVOICE ISSUER | BILLING AMOUNT (TAX INCLUDED) | DATE OF INVOICE | DATE AND TIME OF REGISTRATION | STATUS |
|---|---|---|---|---|---|
| ☑ | COMPANY CA | 54,000 | 2019/09/03 | 2019/09/25 13:20:01 | COMBINED |
| ☐ | COMPANY CA | 35,600 | 2019/09/05 | 2019/09/20 16:31:12 | CONFIRMED |
| ☐ | COMPANY CB | 12,800 | 2019/09/08 | 2019/09/22 16:28:26 | UNPROCESSED |
| ☐ | COMPANY CA | 0 | 2019/09/03 | 2019/09/25 13:20:01 | COMBINED |
| ☐ | COMPANY CB | 12,800 | 2019/09/08 | 2019/09/22 15:28:26 | UNPROCESSED |
| ☐ | COMPANY CA | 11,000 | 2019/09/05 | 2019/09/23 10:31:12 | UNPROCESSED |
| ☐ | COMPANY CA | 54,000 | 2019/09/03 | 2019/09/26 09:00:02 | COMBINING RESULT (IDS: 1, 4) UNPROCESSED |

< CHECK/CHANGE LEDGER SHEET

Page ◁ 1/1 ▷  Zoom ⊕ ⊖

INVOICE

DATE OF INVOICE: SEPTEMBER 3, 2019
FROM: COMPANY GA

TO: AC CORPORATION

PLEASE PROCEED WITH PAYMENT AS FOLLOWS:
PAYMENT DUE DATE : SEPTEMBER 20, 2019

DESCRIPTION:
CUSTOMER NO.  A1-4567-89
INVOICE NO.   A123-03
CUTOFF DATE   SEPTEMBER 30, 2019

INVOICE TOTAL    ¥1,790,208
CONSUMPTION TAX  ¥132,608

SHINJUKU BANK    BRANCH: CENTRAL BRANCH
ACCOUNT TYPE: CHECKING  ACCOUNT NUMBER: 96XXXX
NAME ON ACCOUNT: ABC FURNITURE CENTER CO.

| ARTICLE CODE | ARTICLE NAME   | QUANTITY | UNIT PRICE | PRICE    |
|--------------|----------------|----------|------------|----------|
| 10845        | RECEPTION TABLE| 2        | ¥59,800    | ¥119,600 |
| 22563        | OFFICE DESK    | 14       | ¥14,800    | ¥207,200 |
| 00562        | CHAIR          | 14       | ¥36,800    | ¥515,200 |
| 41523        | CABINET        | 10       | ¥59,800    | ¥598,000 |
| 20783        | SHREDDER       | 2        | ¥19,800    | ¥39,600  |
| 30856        | REFRIGERATOR   | 2        | ¥89,000    | ¥178,000 |
|              |                |          | SUBTOTAL   | ¥1,657,600 |

INVOICE ISSUER INFORMATION

[UNPROCESSED]  [SELECT INVOICES TO BE COMBINED]

INVOICE NUMBER  A123-03   DATE OF INVOICE  2018/07/20
INVOICE ISSUER  COMPANY GA

BILLING AMOUNT (TAX EXCLUDED)  1,657,600   BILLING AMOUNT (TAX INCLUDED)
JOURNAL
ITEM INFORMATION  [CLEAR JOURNAL]

| | TOTAL SUM PRICE |
|---|---|
| RECEPTION TABLE | 119,600 |
| OFFICE DESK | 207,200 |
| CHAIR | 515,200 |

JOURNAL  [2018/07/20]

CREDIT SUM  TAX INCLUSIVE ◆ 0     DEBIT SUM  TAX INCLUSIVE ◆ 0

| ITEM CODE | 000 | CUSTOMER CODE | | 111 CASH |
|---|---|---|---|---|
| 12345678 | | | | COMPONENT CODE |
| 123 | | | | SUB CODE |

[SAVE]   [CONFIRM]

INFORMATION PROCESSING SYSTEM, INFORMATION PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2019-216252 filed on Nov. 29, 2019 in the Japan Patent Office, the entire disclosure of which is hereby incorporated by reference herein.

BACKGROUND

Technical Field

The present disclosure relates to an information processing system, an information processing method, and a non-transitory recording medium.

Description of the Related Art

There is a ledger sheet recognition technique of reading character strings from image data of a ledger sheet such as an invoice through character recognition and recognizing the read character strings and attributes of the ledger sheet based on predetermined ledger sheet definitions.

According to this technique, however, if the ledger sheet is a multiple-page ledger sheet, the image data of the multiple pages may be recognized as representing different ledger sheets. It is therefore difficult for this technique to handle the multiple-page ledger sheet as one ledger sheet, resulting in time and effort consumption on the management of the ledger sheet.

SUMMARY

In one embodiment of this invention, there is provided an improved information processing system that includes, for example, at least one information processing apparatus. The information processing system includes circuitry that outputs a list of ledger sheet management information items to a terminal apparatus. Each of the ledger sheet management information items is extracted from a ledger sheet recognition result of ledger sheet recognition executed on ledger sheet image data of a ledger sheet. Based on a combination of ledger sheet management information items included in the list of ledger sheet management information items and identified as meeting a certain condition, the circuitry causes the terminal apparatus to display a preview screen including respective preview images of a plurality of ledger sheet images corresponding to the ledger sheet management information items included in the combination of ledger sheet management information items.

In one embodiment of this invention, there is provided an improved information processing method executed by an information processing apparatus. The information processing method includes, for example, outputting a list of ledger sheet management information items to a terminal apparatus. Each of the ledger sheet management information items is extracted from a ledger sheet recognition result of ledger sheet recognition executed on ledger sheet image data of a ledger sheet. The information processing method further includes, based on a combination of ledger sheet management information items included in the list of ledger sheet management information items and identified as meeting a certain condition, displaying, on a display of the terminal apparatus, a preview screen including respective preview images of a plurality of ledger sheet images corresponding to the ledger sheet management information items included in the combination of ledger sheet management information items.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 5 is a diagram illustrating an example of a ledger sheet definition database in the server of the first embodiment;

FIGS. 7A and 7B are a sequence diagram illustrating an operation of the ledger sheet recognition system of the first embodiment;

FIG. 9 is a diagram illustrating an example of a job list generated by the operation of the ledger sheet recognition system of the first embodiment;

FIG. 11 is a diagram illustrating acquisition of recognition result data executed in the first embodiment;

FIG. 12 is a diagram illustrating an example of an invoice management database in the server of the first embodiment;

FIG. 13 is a diagram illustrating an example of display of the terminal apparatus of the first embodiment;

FIGS. 14A and 14B are a flowchart illustrating a process of a combining unit of the server of the first embodiment;

FIGS. 15 to 19 are diagrams illustrating examples of the display of the terminal apparatus of the first embodiment;

FIG. 20 is a diagram illustrating an example of the invoice management database in the server of the first embodiment;

FIGS. 21 and 22 are diagrams illustrating examples of the display of the terminal apparatus of the first embodiment;

FIG. 24 is a diagram illustrating an example of the display of the terminal apparatus of the second embodiment.

Figure 1:
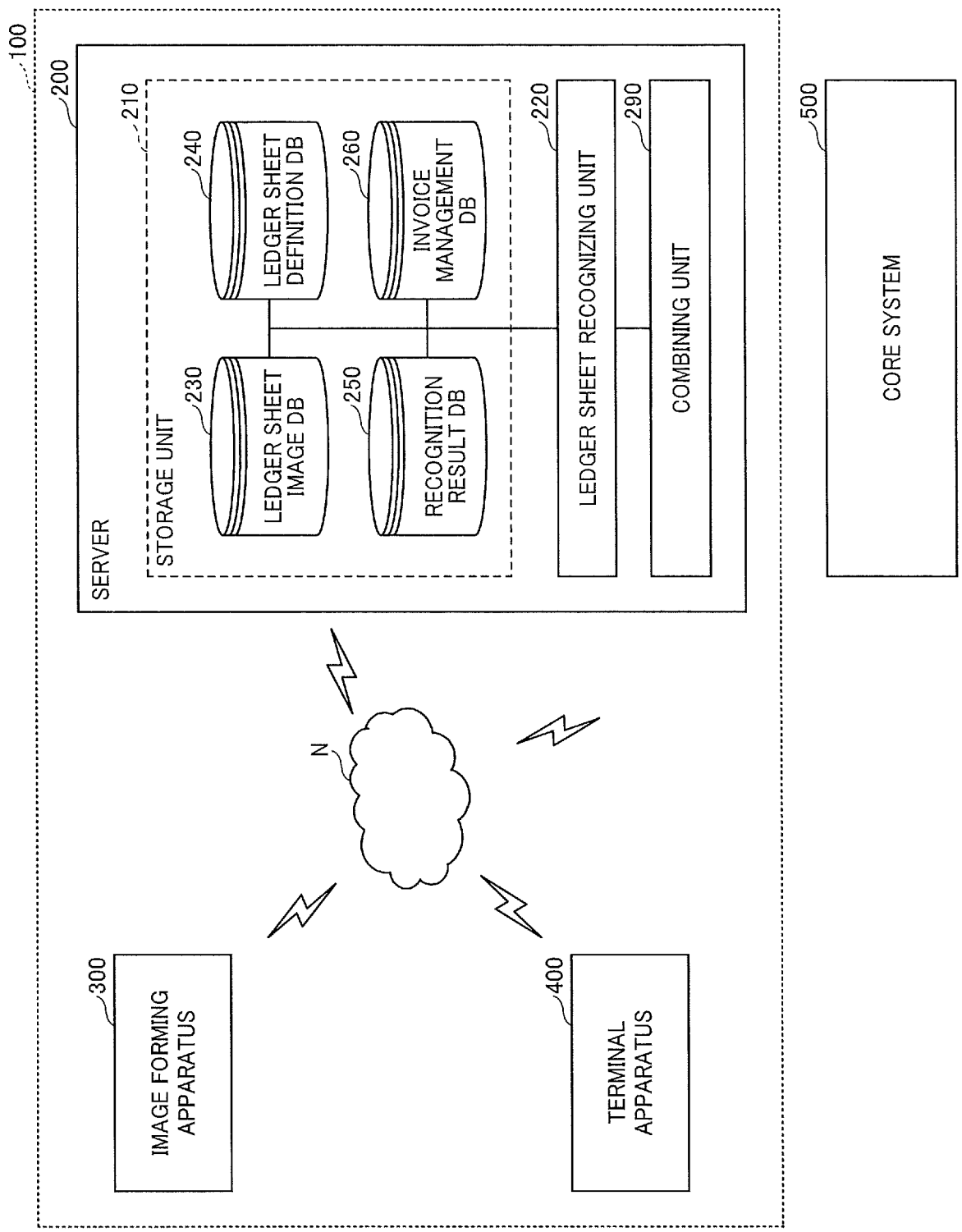
FIG. 1 is a diagram illustrating an example of the system configuration of a ledger sheet recognition system of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

A first embodiment of the present invention will be described below with reference to the drawings.

FIG. 1 is a diagram illustrating an example of the system configuration of a ledger sheet recognition system of the first embodiment.

A ledger sheet recognition system 100 of the first embodiment includes at least one server 200, an image forming apparatus 300, and a terminal apparatus 400, which are connected to each other via a network N. The ledger sheet recognition system 100 of the first embodiment is an example of an information processing system. The server 200 of the first embodiment is an example of an information processing apparatus.

The terminal apparatus 400 of the first embodiment is connected to a core system 500 via the network N, for example. The core system 500 is a system that performs a particular process with a result of recognizing a ledger sheet in the ledger sheet recognition system 100 of the first embodiment, for example. Specifically, the core system 500 may be an accounting system or a quotation preparation system, for example.

In the ledger sheet recognition system 100 of the first embodiment, the server 200 extracts, from image data representing the image of a ledger sheet read by a scanner function of the image forming apparatus 300, items and the values of the items included in the ledger sheet, and generates text data associating the items with the values of the items.

In the following description, the image of the ledger sheet read by the scanner function of the image forming apparatus 300 will be described as the ledger sheet image, and the image data representing the ledger sheet image will be described as the ledger sheet image data.

Further, in the following description, extracting an item and the value of the item from the ledger sheet image and converting the item and the value of the item into text data associating the item with the value of the item will be described as the ledger sheet recognition.

The following description will be given of an invoice as an example of the ledger sheet. The ledger sheet, however, is not limited to the invoice. For example, the ledger sheet of the first embodiment may be a statement of delivery or a receipt, for example.

The server 200 of the first embodiment includes a storage unit 210, a ledger sheet recognizing unit 220, and a combining unit 290. The storage unit 210 includes a ledger sheet image database (DB) 230, a ledger sheet definition DB 240, a recognition result DB 250, and an invoice management DB 260.

The ledger sheet image DB 230 stores the ledger sheet image data. The ledger sheet definition DB 240 stores ledger sheet definition information that is referred to in the ledger sheet recognition performed by the ledger sheet recognizing unit 220. The recognition result DB 250 stores recognition result data that is information representing the result of the ledger sheet recognition performed by the ledger sheet recognizing unit 220. The invoice management DB 260 stores invoice management information that associates information related to the invoice (hereinafter referred to as the invoice information) extracted from the recognition result data with the ledger sheet image data. The invoice management information of the first embodiment is an example of ledger sheet management information that associates information related to the ledger sheet extracted from the recognition result data with the ledger sheet image data.

The ledger sheet recognizing unit 220 of the first embodiment acquires the ledger sheet image data stored in the ledger sheet image DB 230, executes the ledger sheet recognition with the ledger sheet definition information stored in the ledger sheet definition DB 240, and stores the result of the ledger sheet recognition in the recognition result DB 250. The ledger sheet definition information includes information representing the description positions of item names and item values included in the ledger sheet.

In response to receipt of an instruction from the terminal apparatus 400 to combine ledger sheet image data items, the combining unit 290 of the first embodiment identifies candidate invoices (i.e., candidate ledger sheets) to be combined together with reference to the invoice management DB 260, and outputs a list of the identified candidate invoices to the terminal apparatus 400. Further, in response to receipt of an instruction from the terminal apparatus 400 to combine invoices selected from the identified candidate invoices as the invoices to be combined together, the combining unit 290 combines the ledger sheet image data items corresponding to the selected invoices.

In the ledger sheet recognition system 100 of the first embodiment, the image forming apparatus 300 is a multi-function peripheral/product/printer (MFP) with a scanner function. The image forming apparatus 300 is installed with applications (i.e., application programs) for implementing functions such as the scanner function, a copier function, and a facsimile (FAX) function. When the application corresponding to a desired one of the functions is selected, the desired function is implemented.

The terminal apparatus 400 of the first embodiment is used by a user of the ledger sheet recognition system 100. The terminal apparatus 400 may display the result of the ledger sheet recognition performed by the server 200.

In the first embodiment, the user is a company or firm that issues the ledger sheet, for example. More specifically, the user is a business establishment, company, firm, or organization, for example, which has a contract to use a service provided by the ledger sheet recognition system 100.

In the configuration example of FIG. 1, the server 200 includes four databases in the storage unit 210. The databases, however, are not limited to this example. The databases may be partially disposed outside the server 200, or all of the databases may be included in an external apparatus.

Further, in the example of FIG. 1, the ledger sheet recognizing unit 220 and the combining unit 290 are implemented by the server 200. However, the ledger sheet recognizing unit 220 and the combining unit 290 are not necessarily implemented thereby, and may be implemented by a plurality of information processing apparatuses.

Further, in the example of FIG. 1, the ledger sheet recognition system 100 includes one image forming apparatus 300 and one terminal apparatus 400. The ledger sheet recognition system 100, however, may include a desired number of image forming apparatuses 300 and a desired number of terminal apparatuses 400.

Respective hardware configurations of the apparatuses included in the ledger sheet recognition system 100 of the first embodiment will be described with reference to FIGS. 2 to 4.

Figure 2:
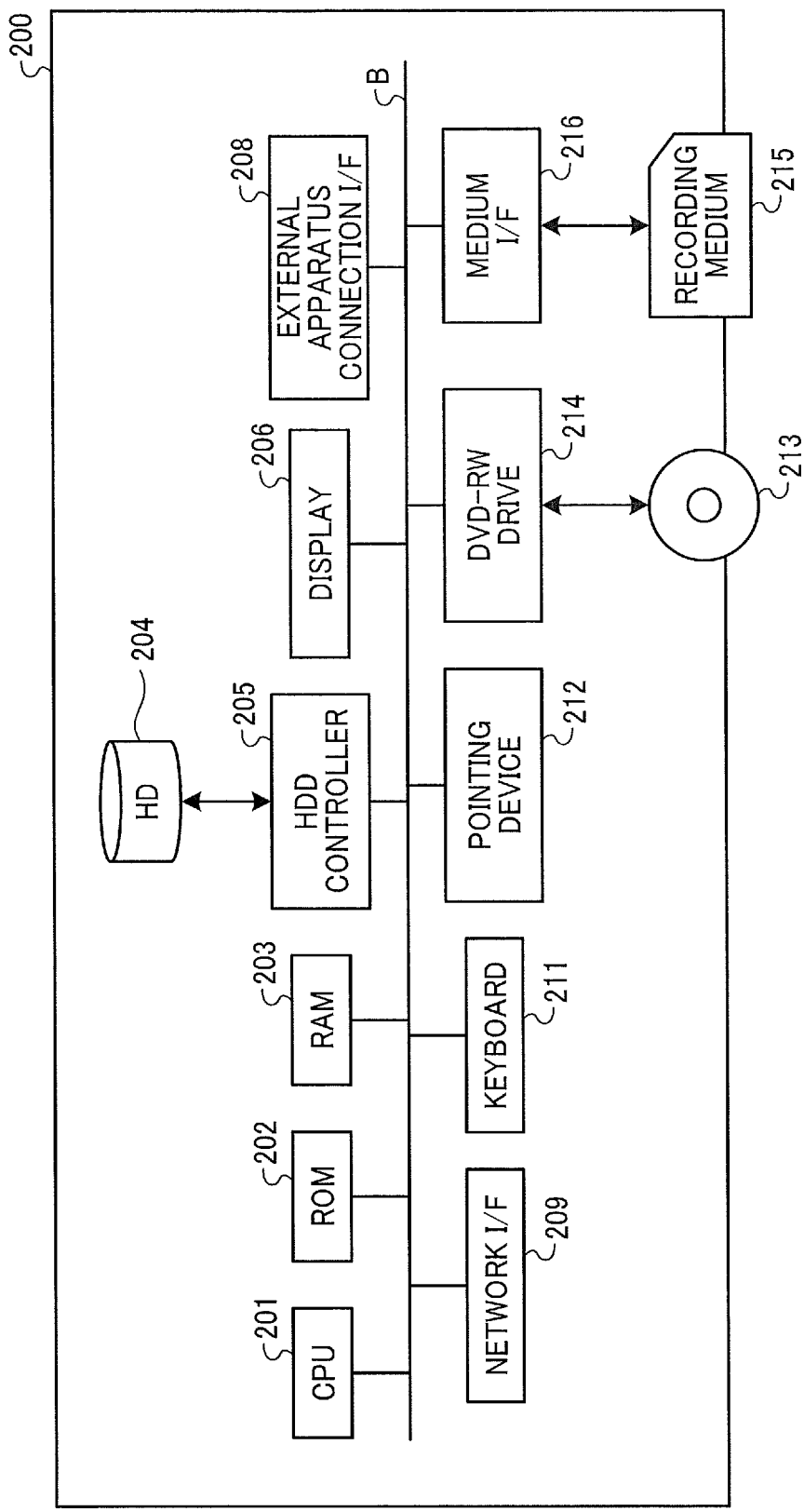
FIG. 2 is a diagram illustrating an example of the hardware configuration of a server included in the ledger sheet recognition system of the first embodiment.

FIG. 2 is a diagram illustrating an example of the hardware configuration of the server 200. The server 200 of the first embodiment is implemented by a computer. As illustrated in FIG. 2, the server 200 is an information processing apparatus including a central processing unit (CPU) 201, a read only memory (ROM) 202, a random access memory (RAM) 203, a hard disk (HD) 204, a hard disk drive (HDD) controller 205, a display 206, an external apparatus connection interface (I/F) 208, a network I/F 209, a data bus B, a keyboard 211, a pointing device 212, a digital versatile disk-rewritable (DVD-RW) drive 214, and a medium I/F 216.

The CPU 201 controls the operation of the entire server 200. The ROM 202 stores a program used to drive the CPU 201, such as an initial program loader (IPL). The RAM 203 is used as a work area for the CPU 201. The HD 204 stores various data of programs, for example. The HDD controller 205 controls writing and reading of various data to and from the HD 204 under the control of the CPU 201. The display 206 displays various information such as a cursor, menus, windows, text, and images.

The external apparatus connection I/F 208 is an interface for connecting the server 200 to various external apparatuses. The external apparatuses in this case include a universal serial bus (USB) memory and a printer, for example. The network I/F 209 is an interface for performing data communication via a communication network. The data bus B includes an address bus and a data bus for electrically connecting the CPU 201 and the other components in FIG. 2 to each other.

The keyboard 211 is an input device including a plurality of keys for inputting text, numerical values, and various instructions, for example. The pointing device 212 is in input device used to select and execute various instructions, select a processing target, and move the cursor, for example. The DVD-RW drive 214 controls writing and reading of various data to and from a DVD-RW 213 as an example of a removable recording medium. The removable recording medium is not limited to the DVD-RW, and may be a DVD-recordable (DVD-R), for example. The medium I/F 216 controls writing (i.e., storage) and reading of data to and from a recording medium 215 such as a flash memory.

The server 200 of the first embodiment may be a smartphone, a tablet terminal, a personal digital assistant (PDA), or a wearable personal computer (PC), for example.

Figure 3:
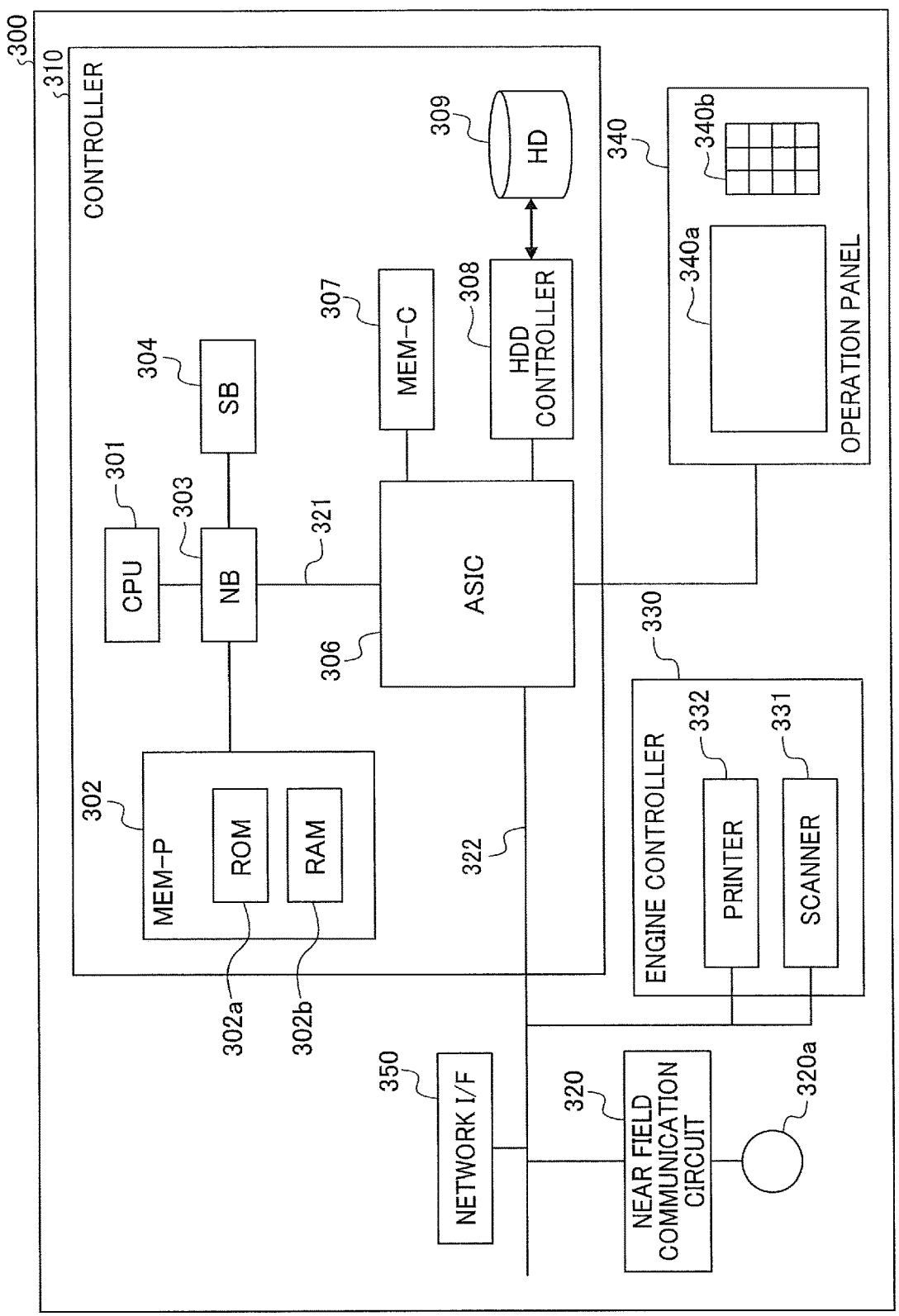
FIG. 3 is a diagram illustrating an example of the hardware configuration of an image forming apparatus included in the ledger sheet recognition system of the first embodiment.

FIG. 3 is a diagram illustrating an example of the hardware configuration of the image forming apparatus 300. As illustrated in FIG. 3, the image forming apparatus 300, which is an MFP in the present example, includes a controller 310, a near field communication circuit 320, an engine controller 330, an operation panel 340, and a network I/F 350.

The controller 310 includes a CPU 301 as a major unit of a computer forming the image forming apparatus 300, a system memory (MEM-P) 302, a north bridge (NB) 303, a south bridge (SB) 304, an application specific integrated circuit (ASIC) 306, a local memory (MEM-C) 307, an HDD controller 308, and an HD 309 serving as a memory. The NB 303 and the ASIC 306 are connected by an accelerated graphics port (AGP) bus 321.

The CPU 301 is a control device that performs overall control of the image forming apparatus 300. The NB 303 is s bridge for connecting the CPU 301, the MEM-P 302, the SB 304, and the AGP bus 321 to each other. The NB 303 includes a memory controller for controlling data writing and reading to and from the MEM-P 302, a peripheral component interconnect (PCI) master, and an AGP target.

The MEM-P 302 includes a ROM 302a and a RAM 302b. The ROM 302a is a memory for storing programs and data for implementing the functions of the controller 310. The RAM 302b is used as a memory in deploying a program or data or as a rendering memory in memory printing, for example. Each of the programs stored in the ROM 302a may be provided as recorded on a computer readable recording medium, such as a compact disk-ROM (CD-ROM), a CD-recordable (CD-R), or a DVD, in an installable or executable file format.

The SB 304 is a bridge for connecting the NB 303 to a PCI device or a peripheral device. The ASIC 306 is an integrated circuit (IC) for image processing, which includes hardware components for image processing. The ASIC 306 functions as a bridge for connecting the AGP bus 321, a PCI bus 322, the HDD controller 308, and the MEM-C 307 to each other. The ASIC 306 includes a PCI target, an AGP master, an arbiter forming a core of the ASIC 306, a memory controller for controlling the MEM-C 307, a plurality of direct memory access controllers (DMACs) that execute processes such as the rotation of image data with a hardware logic, and a PCI unit that transfers data to and from a scanner 331 or a printer 332 via the PCI bus 322. The ASIC 306 may be connected to an interface conforming to a standard such as USB or institute of electrical and electronics engineers (IEEE) 1394.

The MEM-C 307 is a local memory used as a copy image buffer and a code buffer. The HDD 309 is a storage device for storing image data, font data for use in printing, and form data. The HDD controller 308 controls data writing and reading to and from the HD 309 under the control of the CPU 301. The AGP bus 321 is a bus interface for a graphics accelerator card proposed to speed up graphics processing. The AGP bus 321 enables the graphics accelerator card to directly access the MEM-P 302 with a high throughput, thereby implementing a high-speed graphics accelerator card.

The near field communication circuit 320, which includes an antenna 320a, is a communication circuit conforming to a standard such as near field communication (NFC) or Bluetooth (registered trademark).

The engine controller 330 includes the scanner 331 and the printer 332. The operation panel 340 includes a panel display 340a and an operation panel 340b. The panel display 340a is implemented by a touch panel, for example, to display the current setting values and a selection screen and receive an input from an operator (i.e., user). The operation panel 340b includes keys such as numeric keys for receiving the setting values of conditions related to image formation such as a density setting condition and a start key for receiving a copy start instruction. The controller 310 controls the entire image forming apparatus 300 to control rendering, communication, and input to the operation panel 340, for example. Each of the scanner 331 and the printer 332 includes an image processing device that performs processes such as error diffusion and gamma conversion.

With an application switch key of the operation panel 340, the function of the image forming apparatus 300 is sequentially switched to a document box function, the copier function, the printer function, and the FAX function, for example, to select a desired function. When the document box function is selected, the image forming apparatus 300 is switched to a document box mode. When the copier function is selected, the image forming apparatus 300 is switched to a copy mode. When the printer function is selected, the image forming apparatus 300 is switched to a printer mode. When the FAX function is selected, the image forming apparatus 3 is switched to a FAX mode.

The network I/F 350 is an interface for performing data communication via a communication network. The near field communication circuit 320 and the network I/F 350 are electrically connected to the ASIC 306 via the PCI bus 322.

Figure 4:
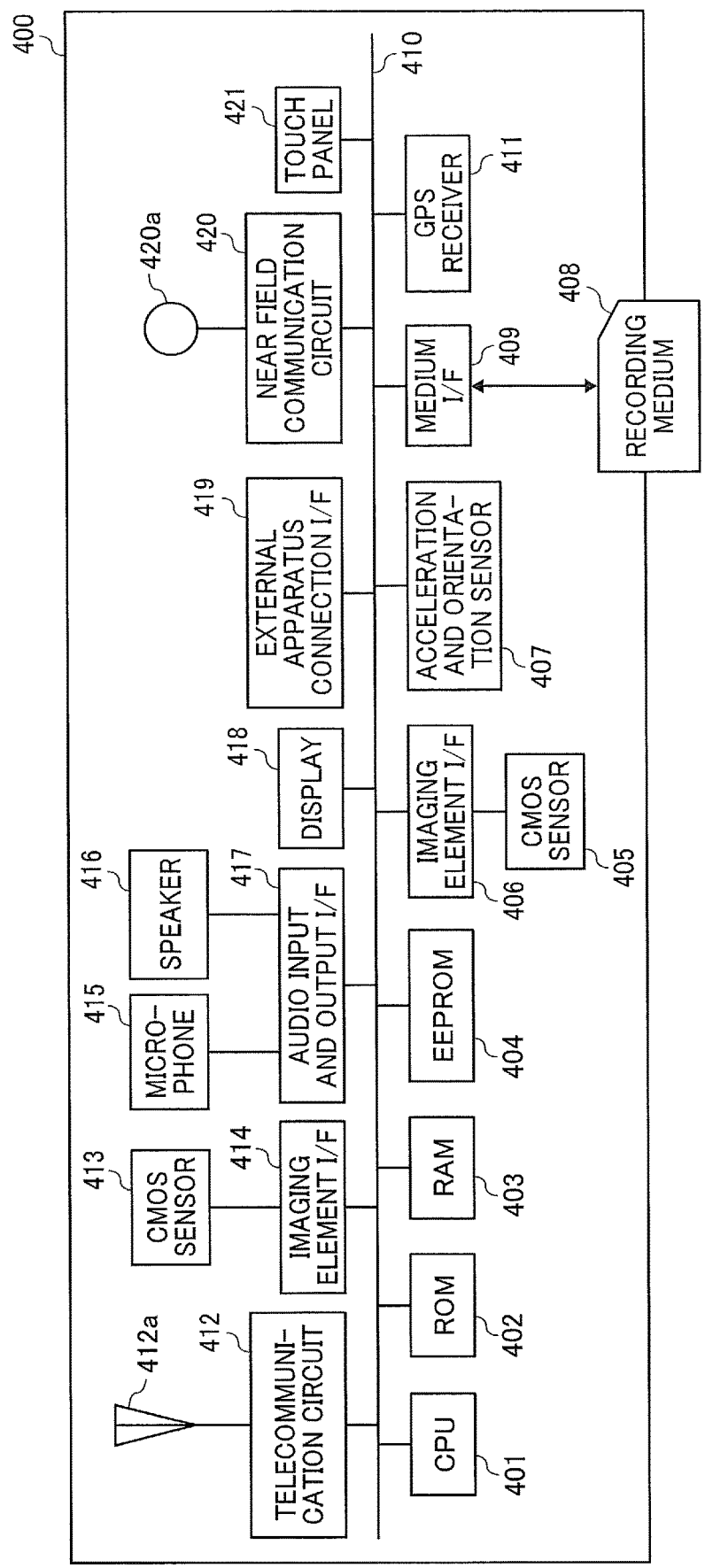
FIG. 4 is a diagram illustrating an example of the hardware configuration of a terminal apparatus included in the ledger sheet recognition system of the first embodiment.

FIG. 4 is a diagram illustrating an example of the hardware configuration of the terminal apparatus 400. The terminal apparatus 400 of the first embodiment includes a CPU 401, a ROM 402, a RAM 403, an electrically erasable programmable read only memory (EEPROM) 404, a complementary metal oxide semiconductor (CMOS) sensor 405, an imaging element I/F 406, an acceleration and orientation sensor 407, a medium I/F 409, and a global positioning system (GPS) receiver 411.

The CPU 401 controls the operation of the entire terminal apparatus 400. The ROM 402 stores a program used to drive the CPU 401 such as an IPL. The RAM 403 is used as a work area for the CPU 401. The EEPROM 404 writes or reads various data of a program for a smartphone, for example, under the control of the CPU 401. The CMOS sensor 405 is a built-in imaging device that captures the image of a subject (mainly the image of a user) under the control of the CPU 401 to obtain image data. The CMOS sensor 405 may be replaced by another imaging device such as a charge coupled device (CCD) sensor. The imaging element I/F 406 is a circuit that controls the driving of the CMOS sensor 405. The acceleration and orientation sensor 407 includes various types of sensors such as an electromagnetic compass that detects geomagnetism, a gyrocompass, and an acceleration sensor. The medium I/F 409 controls data writing (i.e., storage) and reading to and from a recording medium 408 such as a flash memory. The GPS receiver 411 receives a GPS signal from a GPS satellite.

The terminal apparatus 400 further includes a telecommunication circuit 412, an antenna 412a for the telecommunication circuit 412, a CMOS sensor 413, an imaging element I/F 414, a microphone 415, a speaker 416, an audio input and output I/F 417, a display 418, an external apparatus connection I/F 419, a near field communication circuit 420, an antenna 420a for the near field communication circuit 420, a touch panel 421, and a bus line 410.

The telecommunication circuit 412 is a circuit that communicates with another apparatus via a communication network. The CMOS sensor 413 is a built-in imaging device that captures the image of a subject under the control of the CPU 401 to obtain image data. The imaging element I/F 414 is a circuit that controls the driving of the CMOS sensor 413. The microphone 415 is a built-in circuit that converts sound into an electrical signal. The speaker 416 is a built-in circuit that convers an electrical signal into physical vibration to produce the sound of music or voice, for example. The audio input and output I/F 417 is a circuit that processes the input of an audio signal from the microphone 415 and the output of an audio signal to the speaker 416 under the control of the CPU 401. The display 418 is a liquid crystal or organic electroluminescence (EL) display, for example, which displays the image of the subject and various icons, for example. The external apparatus connection I/F 419 is an interface for connecting the terminal apparatus 400 to various external apparatuses. The near field communication circuit 420 is a communication circuit conforming to a standard such as NFC or Bluetooth. The touch panel 421 is an input device for the user to operate the terminal apparatus 400 by pressing the display 418. The bus line 410 includes an address bus and a data bus for electrically connecting the CPU 401 and the other components in FIG. 4 to each other.

The ledger sheet definition DB 240 of the first embodiment will be described with FIG. 5.

FIG. 5 is a diagram illustrating an example of the ledger sheet definition DB 240 of the first embodiment. The ledger sheet definition DB 240 of the first embodiment may be previously stored in the server 200. The ledger sheet definition DB 240 of the first embodiment includes information items such as "item identifier (ID)," "item name," "direction," and "distance." The item "item ID" is associated with the other items.

In the ledger sheet definition DB 240 of the first embodiment, information including the value of the item "item ID" and the values of the other items will be described as ledger sheet definition information.

The value of the item "item ID" is an identifier for identifying an item included in the ledger sheet. The value of the item "item name" represents the name of the item.

Items such as "direction" and "distance" represent the extraction range of a character string. For example, when the value of the item "direction" and the value of the item "distance" are "RD" and "20 mm," respectively, these items indicate that a character string is extracted from a range of 20 mm downward from the coordinates of the lower-right corner of a rectangle circumscribed on a character string representing the item name That is, the items such as "direction" and "distance" of the first embodiment are conditions representing the extraction range of the character string, and these conditions are associated with the item name. The conditions representing the extraction range of the character string are the items "direction" and "distance" in the example of FIG. 5, but may include another item.

For example, therefore, a character string extracted from a range of 20 mm downward from the coordinates of the lower-right corner of a rectangle circumscribed on a character string of an item name "total sum" corresponding to an item ID "2" is recognized as the value of the item corresponding to the item name "total sum."

The ledger sheet definition information includes information related to a plurality of items that may be included in the ledger sheet.

Functions of the server 200 of the first embodiment will be described with reference to FIG. 6.

Figure 6:
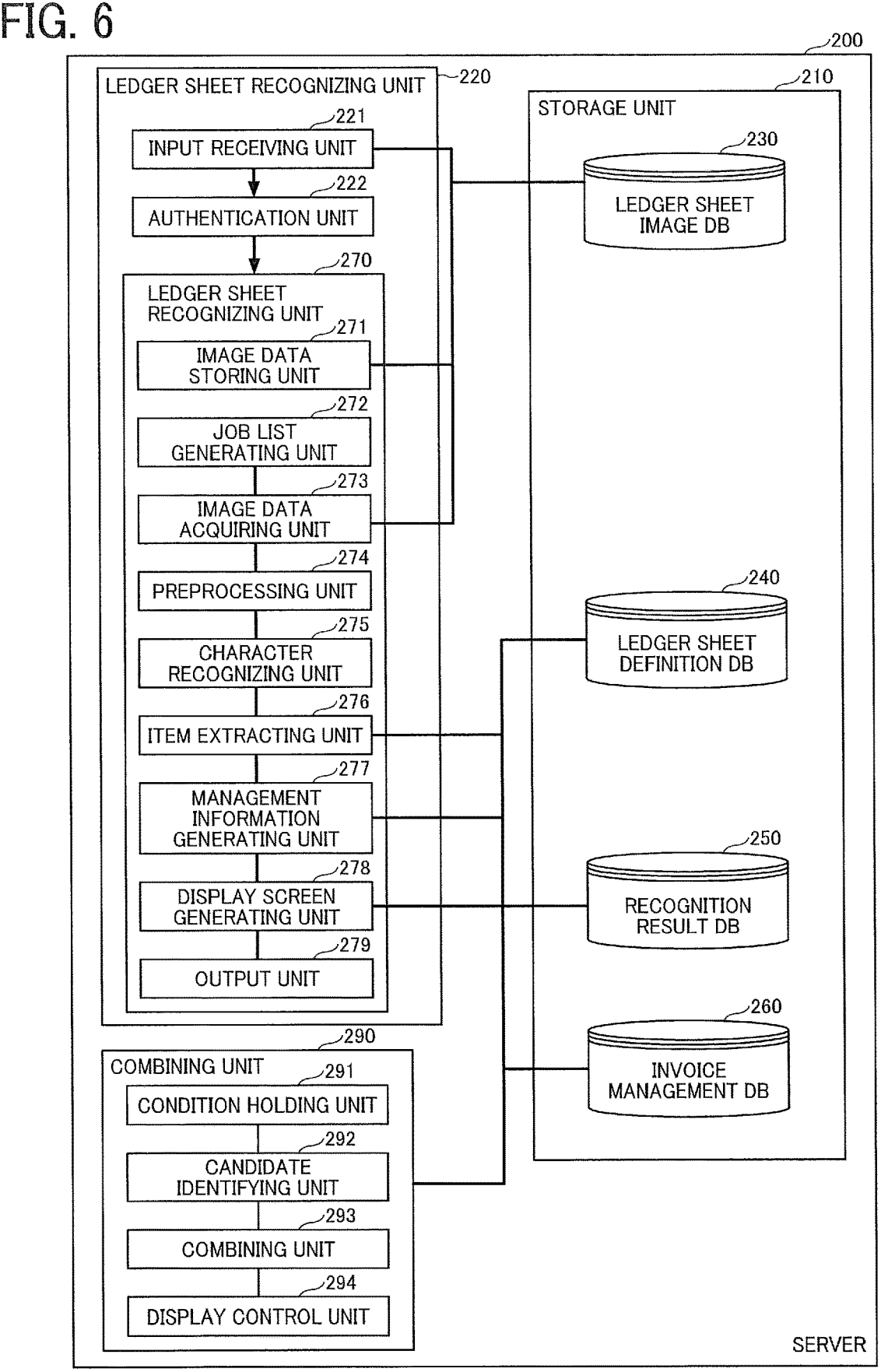
FIG. 6 is a diagram illustrating functions of the server of the first embodiment.

FIG. 6 is a diagram illustrating functions of the server 200 of the first embodiment. In the server 200 of the first embodiment, the CPU 201 reads and executes a program stored in a memory such as the ROM 202 or the RAM 203, for example, to thereby implement the functions of the units described below.

server 200 of the first embodiment includes the ledger sheet recognizing unit 220 and the combining unit 290, as described above. The ledger sheet recognizing unit 220 includes an input receiving unit 221, an authentication unit 222, and a ledger sheet recognizing unit 270.

The input receiving unit 221 receives a variety of inputs to the server 200. Specifically, the input receiving unit 221 receives input of authentication information for logging in to the ledger sheet recognition system 100. The authentication information includes a user ID and a password, for example. The input receiving unit 221 further receives input of the ledger sheet image data transmitted from the image forming apparatus 300, for example.

The authentication unit 222 performs authentication based on the authentication information input to the input receiving unit 221. For example, the authentication unit 222 may transmit the input authentication information to an authentication server disposed outside the server 200, and may acquire a result of authentication performed by the authentication server. If the user is authenticated, the authentication unit 222 may transmit the ledger sheet image data received by the input receiving unit 221 to the ledger sheet recognizing unit 270.

The ledger sheet recognizing unit 270 of the first embodiment includes an image data storing unit 271, a job list generating unit 272, an image data acquiring unit 273, a preprocessing unit 274, a character recognizing unit 275, an item extracting unit 276, a management information generating unit 277, a display screen generating unit 278, and an output unit 279.

The image data storing unit 271 receives the ledger sheet image data from the image forming apparatus 300, and stores the ledger sheet image data in the ledger sheet image DB 230.

When the input receiving unit 221 receives the input of the ledger sheet image data from the image forming apparatus 300, the job list generating unit 272 registers a job in a job list, and manages the job list. Details of the job list will be described later.

The image data acquiring unit 273 acquires the ledger sheet image data stored in the ledger sheet image DB 230.

The preprocessing unit 274 performs preprocessing for the ledger sheet recognition on the ledger sheet image data acquired by the image data acquiring unit 273.

The character recognizing unit 275 extracts, from the ledger sheet image data, character strings and information of the disposition positions of the character strings, and holds the extracted character strings and information as reading result data. Details of the reading result data will be described later.

The item extracting unit 276 extracts the items and the values of the items from the ledger sheet image data and associates the items with the values of the items based on the reading result data and the ledger sheet definition information stored in the ledger sheet definition DB 240, to thereby generate the recognition result data associating the item IDs of the items with the values of the items. The item extracting unit 276 may generate a file in the extensible markup language (XML) format as the recognition result data. The item extracting unit 276 further extracts the description positions of the items in the ledger sheet and the relative positions of the items and the values of the items.

The management information generating unit 277 extracts the invoice information from the recognition result data generated by the item extracting unit 276, generates the invoice management information associating the extracted invoice information with the ledger sheet image data, and stores the generated invoice management information in the invoice management DB 260.

The invoice information is information representing attributes of the invoice, such as information representing the issuer of the invoice, information representing the date of issuance of the invoice, and information representing the date and time of registration of the invoice in the ledger sheet image DB 230 as the ledger sheet image data. Therefore, the invoice information may be described as attribute information representing the attributes of the invoice. Further, the attribute information may be understood as part of the invoice management information.

The management information generating unit 277 of the first embodiment associates the invoice information (i.e., the attribute information) with information representing the storage location of the ledger sheet image data.

The display screen generating unit 278 generates screen data of a recognition result check screen with the recognition result data stored in the recognition result DB 250. Each item name to be displayed on the recognition result check screen may be previously registered in association with the corresponding item ID. Then, in the process of generating the recognition result check screen, the item name corresponding to the item ID included in the recognition result data may be identified and displayed on the recognition result check screen.

The display screen generating unit 278 further generates screen data of a list screen including a list of invoice management information items (i.e., a list of ledger sheet management information items) generated by the management information generating unit 277.

The output unit 279 outputs the screen data of the recognition result check screen or the list screen generated by the display screen generating unit 278. That is, the output unit 279 causes the terminal apparatus 400 to display, on a web browser, the recognition result check screen or the list screen generated by the display screen generating unit 278.

The combining unit 290 of the first embodiment includes a condition holding unit 291, a candidate identifying unit 292, a combining unit 293, and a display control unit 294.

The condition holding unit 291 stores a certain condition referred to identify the candidate invoices to be combined. In the following description, the certain condition held in the condition holding unit 291 will be described as the candidate condition. The candidate condition may be set by an administrator of the ledger sheet recognition system 100 and previously held in the condition holding unit 291. Further, the candidate condition may be input to the terminal apparatus 400, for example. Details of the candidate condition will be described later.

In response to selection of an invoice by the terminal apparatus 400, the candidate identifying unit 292 identifies the candidate invoices to be combined by referring to the candidate condition held in the condition holding unit 291.

The combining unit 293 combines the candidate invoices identified by the candidate identifying unit 292 with the invoice instructed to be combined therewith. Specifically, combining invoices refers to associating a plurality of ledger sheet image data items with each other as data items of the same invoice. Details of the processes of the candidate identifying unit 292 and the combining unit 293 will be described later.

The display control unit 294 controls the display of the terminal apparatus 400 in accordance with the process of the combining unit 290.

An operation of the ledger sheet recognition system 100 of the first embodiment will be described with reference to FIGS. 7A and 7B.

FIGS. 7A and 7B are a sequence diagram illustrating an operation of the ledger sheet recognition system 100 of the first embodiment.

In the ledger sheet recognition system 100, the image forming apparatus 300 receives a request from the user to start an application for executing the ledger sheet recognition (step S701), and starts the application (step S702).

The image forming apparatus 300 then receives input of the authentication information from the user (step S703), and transmits the authentication information to the server 200 to request authentication (step S704).

In response to receipt of the authentication request, the server 200 performs the authentication with the authentication unit 222, and transmits a result of the authentication to the image forming apparatus 300 (step S705). The processes described below are performed when the user is authenticated.

The image forming apparatus 300 then receives an instruction to scan an invoice (step S706), and scans the invoice to acquire the ledger sheet image data (step S707). The image forming apparatus 300 then transmits the ledger sheet image data to the server 200 (step S708).

In the server 200, the input receiving unit 221 receives the input of the ledger sheet image data, and the authentication unit 222 transfers the ledger sheet image data to the ledger sheet recognizing unit 270 (step S709).

In the ledger sheet recognizing unit 270 of the server 200, in response to receipt of the ledger sheet image data, the job list generating unit 272 registers a job in the job list (step S710). Then, in the ledger sheet recognizing unit 270, the image data storing unit 271. stores the ledger sheet image data in the ledger sheet image DB 230 (step S711).

Then, with the image data acquiring unit 273, the ledger sheet recognizing unit 270 acquires the ledger sheet image data to be recognized from the ledger sheet image DB 230 (step S712). The ledger sheet recognizing unit 270 then executes the process pf recognizing the ledger sheet image, and generates the recognition result data with the item extracting unit 276 (step S713).

Then, the ledger sheet recognizing unit 270 stores the recognition result data generated by the item extracting unit 276 in the recognition result DB 250 (step S714).

With the management information generating unit 277, the ledger sheet recognizing unit 270 then generates the invoice management information based on the recognition result data (step S715), and stores the generated invoice management information in the invoice management DB 260 (step S716).

Then, in the ledger sheet recognition system 100, the terminal apparatus 400 receives input of an instruction from the user to display the browser (step S717), and requests the server 200 to display the browser to display the recognition result data (step S718).

The terminal apparatus 400 further receives input of authentication information from the user (step S719), and transmits the authentication information to the server 200 (step S720).

With the authentication unit 222, the server 200 performs authentication of the user (step S721). If the user is authenticated, the server 200 transmits, to the terminal apparatus 400, a result of the authentication and an instruction to display the list screen displaying the list of invoice management information items (step S722). The processes described here are performed when the user is authenticated.

In response to receipt of the instruction to display the list screen, the terminal apparatus 400 displays the list screen displaying the list of invoice management information items (step S723). That is, via the output unit 279, the server 200 causes the terminal apparatus 400 to display the list screen.

The operation of the ledger sheet recognition system 100 will be further described with reference to FIGS. 8A and 8B to FIG. 12.

Figure 8A:
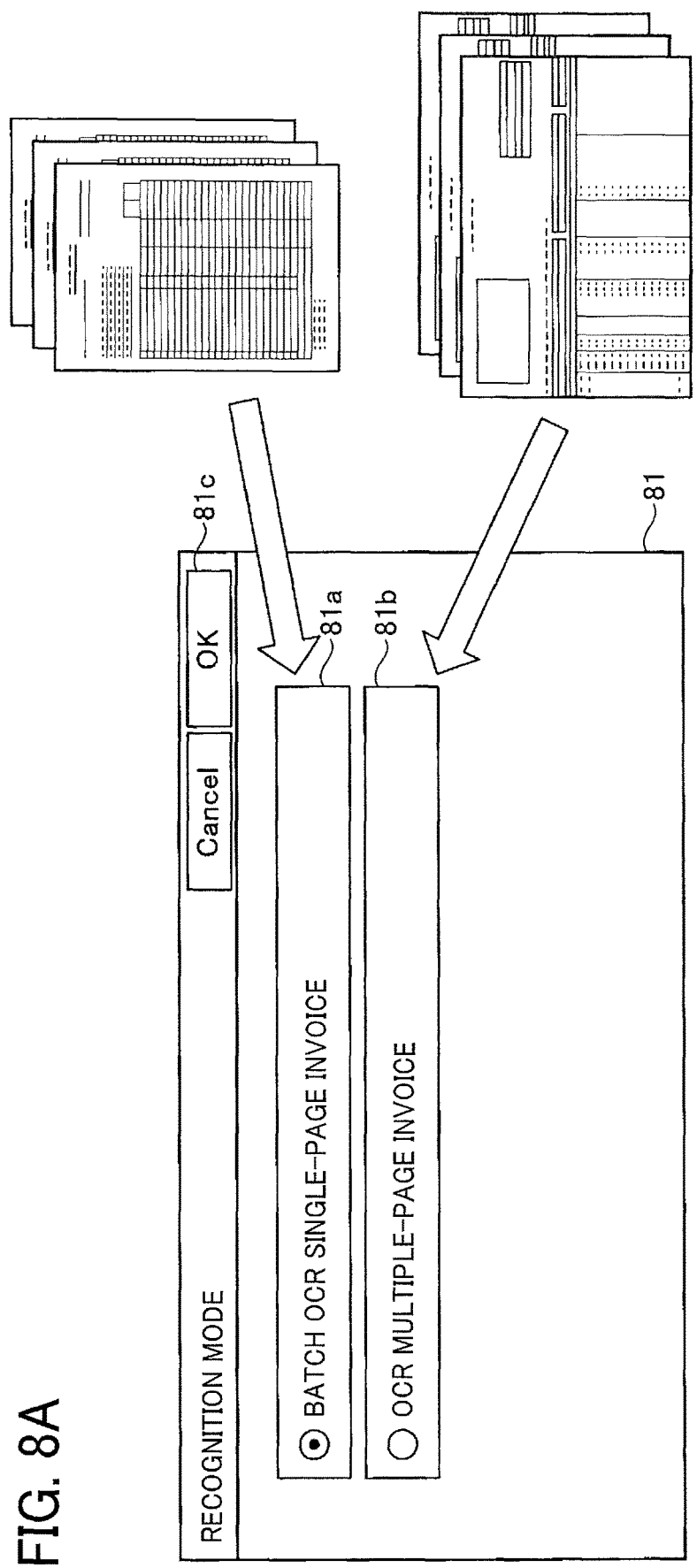
FIGS. 8A and 8B are diagrams illustrating scanning of an invoice executed in the first embodiment.
Figure 8B:
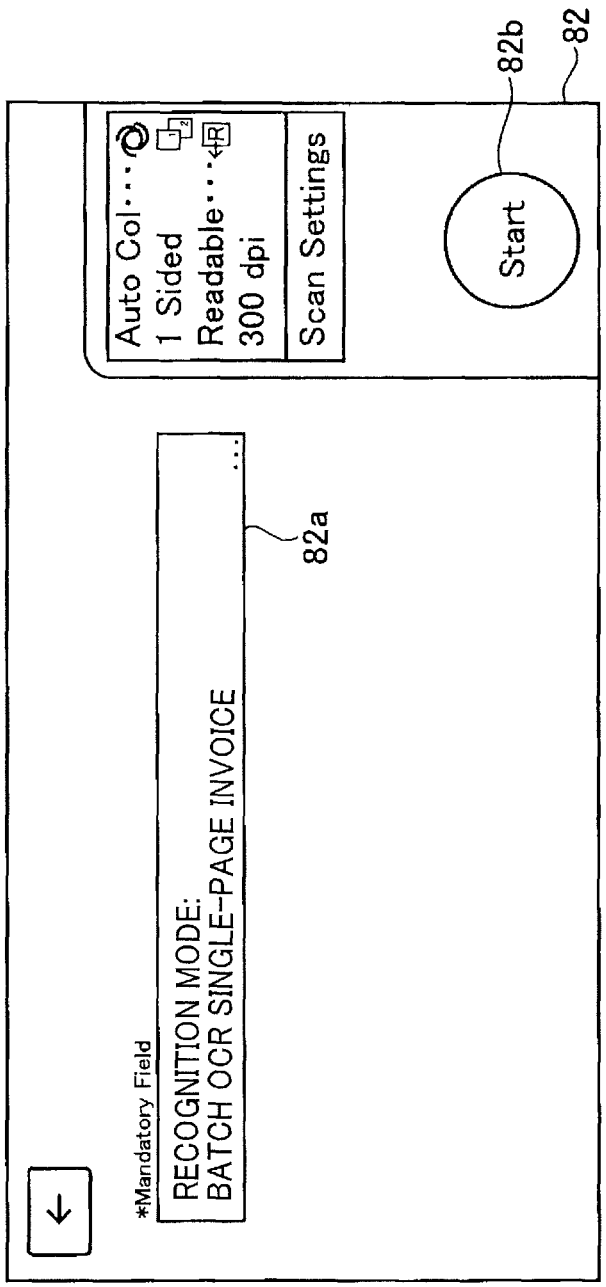

FIGS. 8A and 8B are diagrams illustrating the scanning of the invoice preformed in the first embodiment. In the first embodiment, the image forming apparatus 300 has a first recognition mode and a second recognition mode.

The first recognition mode refers to a mode for transmitting, to the server 200, the ledger sheet image data of an invoice obtained by scanning one page of the invoice and an instruction to execute the character recognition on the page.

The second recognition mode refers to a mode for transmitting, to the server 200, the ledger sheet image data of multiple pages obtained by batch scanning a multiple-page invoice and an instruction to execute the character recognition on the ledger sheet image data of the multiple pages.

FIG. 8A illustrates a screen 81 as an example of a recognition mode selection screen displayed on the operation panel 340 of the image forming apparatus 300, for example.

The screen 81 displays an operation button 81a for selecting the first recognition mode and an operation button 81b for selecting the second recognition mode. In the example of FIG. 8A, the operation button 81a is selected to select the first recognition mode.

If an operation button 81c is operated when the operation button 81a is selected, the screen 81 transitions to a screen 82 illustrated in FIG. 8B.

The screen 82 displays information 82a indicating that the first recognition mode has been selected. If an operation button 82b is operated in this state, the image forming apparatus 300 scans the invoice placed on an automatic document feeder (ADF), for example.

The information generated by the process of the ledger sheet recognizing unit 270 of the first embodiment will be described with FIG. 9.

FIG. 9 is a diagram illustrating an example of the job list generated by the operation of the ledger sheet recognition system 100 of the first embodiment.

In the server 200 of the first embodiment, in response to receipt of input of the ledger sheet image data from the image forming apparatus 300, the job list generating unit 272 holds the ledger sheet image data and a job ID associated therewith as a job list.

A job list 101 of the first embodiment includes information items: "job ID," "user ID," "ledger sheet image file path," "recognition result file path," "status," and "definition ID."

The value of the item "job ID" is an identifier for identifying the job, i.e., an identifier for identifying the ledger sheet image data received from the image forming apparatus 300. The value of the item "user ID" is an identifier for identifying the user who has logged in to the ledger sheet recognition system 100.

The value of the item "ledger sheet image file path" is information of the storage location of the ledger sheet image data. The value of the item "recognition result file path" is information of the storage location of the recognition result data representing the recognition result of the ledger sheet image.

The value of the item "status" represents the progress of the recognition of the ledger sheet image data. The value of the item "definition ID" is an identifier for identifying the ledger sheet definition information.

In the first embodiment, the value of the item "status" is one of five statuses: unprocessed, saved as draft, confirmed, externally output, and combined, which are defined as follows.

The unprocessed status (a first status) is a state immediately after the acquisition of the recognition result data through the ledger sheet recognition. In this state, operations such as checking the recognition result data have not been executed.

The saved-as-draft status (a second status) is a state in which the operations such as checking the recognition result data are ongoing and the recognition result data has not been confirmed.

The confirmed status (a third status) is a state in which the operations such as checking the recognition result data have been completed and the recognition result data has been stored in the recognition result DB 250 as confirmed information.

The externally output status (a fourth status) is a state in which the recognition result data has been output to an external system, such as an accounting system, which cooperates with the ledger sheet recognition system 100.

The combined status (a fifth status) is a state in which the recognition result data and the ledger sheet image data as a basis for the recognition result data are associated with other recognition result data and other ledger sheet image data.

In the server 200 of the first embodiment, in response to receipt of the ledger sheet image data from the image forming apparatus 300, the job list generating unit 272 assigns a job ID to the ledger sheet image data, and adds a record of the ledger sheet image data to the job list 101 in association with the user ID acquired as the authentication information. After the ledger sheet image data is stored in the ledger sheet image DB 230, the job list generating unit 272 adds the information of the storage location of the ledger sheet image data to the job list 101 as the value of the item "ledger sheet image file path."

The process of the ledger sheet recognizing unit 270 of the first embodiment will be described in detail with reference to FIG. 10.

Figure 10:
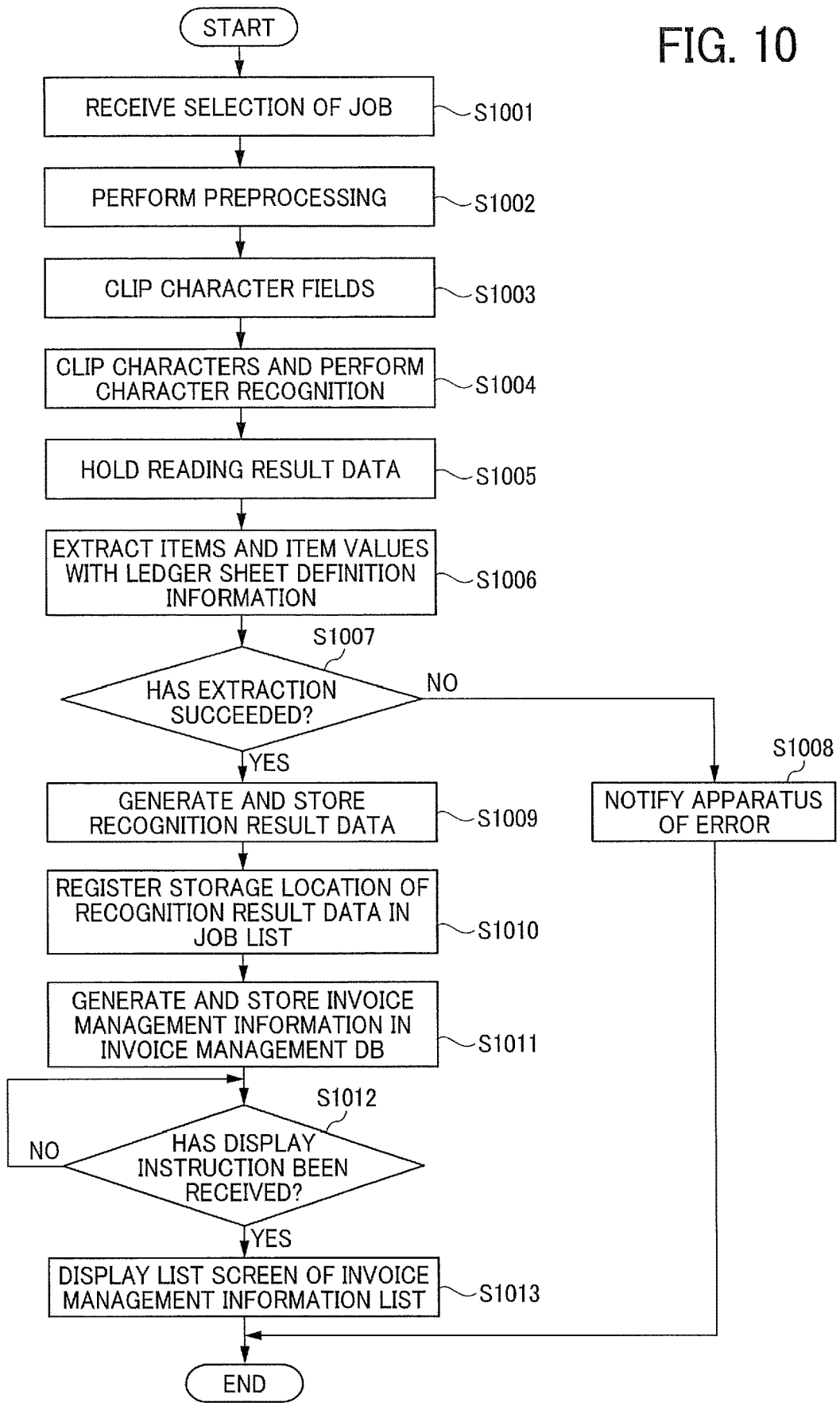
FIG. 10 is a flowchart illustrating a process of a ledger sheet recognizing unit of the server of the first embodiment.

FIG. 10 is a flowchart illustrating the process of the ledger sheet recognizing unit 270 of the first embodiment. FIG. 10 illustrates details of the process of step S713 in FIG. 7B.

The ledger sheet recognizing unit 270 of the first embodiment receives the selection of a job from the job list 101 (step S1001). Then, the preprocessing unit 274 performs the preprocessing for the ledger sheet recognition on the ledger sheet image data acquired by the image data acquiring unit 273 (step S1002). Specifically, the preprocessing includes a correction process to align the orientation of ledger sheet images, for example.

Then, in the ledger sheet recognizing unit 270, the character recognizing unit 275 clips areas each having a character formed therein (hereinafter referred to as the character fields) from the ledger sheet image (step S1003). The character recognizing unit 275 then clips the characters from the character fields, and performs character recognition on the characters (step S1004). In this process, the character recognizing unit 275 further acquires coordinates representing the positions of the clipped characters.

Then, the ledger sheet recognizing unit 270 generates the reading result data based on the relative positions of character strings recognized by the character recognizing unit 275, and holds the generated reading result data (step S1005). Specifically, based on the coordinates of the recognized characters, the ledger sheet recognizing unit 270 recognizes characters separated from each other by a distance equal to or less than a preset threshold value as one character string. Then, the ledger sheet recognizing unit 270 generates the reading result data by associating the character string with information such as the coordinates representing the position of the area in which the character string is formed.

Then, in the ledger sheet recognizing unit 270, the item extracting unit 276 extracts the items and the item values from the ledger sheet image data based on the ledger sheet definition information in the ledger sheet definition DB 240 (step S1006).

The ledger sheet recognizing unit 270 then determines whether the extraction of the items and the item values has succeeded (step S1007).

If it is determined at step S1007 that the extraction of the items and the item values has failed (NO at step S1007), the ledger sheet recognizing unit 270 notifies the terminal apparatus 400 or the image forming apparatus 300 of an error (step S1008), and completes the process thereof.

If it is determined at step S1007 that the extraction of the items and the item values has succeeded (YES at step S1007), the item extracting unit 276 of the ledger sheet recognizing unit 270 generates the recognition result data, in which the extracted items and item values are merged together. The ledger sheet recognizing unit 270 then stores the recognition result data in the recognition result DB 250 (step S1009).

Then, with the job list generating unit 272, the ledger sheet recognizing unit 270 registers the storage location of the recognition result data in the job list 101 (step S1010).

Then, with the management information generating unit 277, the ledger sheet recognizing unit 270 generates the invoice management information with the recognition result data, and stores the generated invoice management information in the invoice management DB 260 (step S1011).

Then, with the display screen generating unit 278, the ledger sheet recognizing unit 270 determines whether a display instruction has been received from the terminal apparatus 400 (step S1012). If it is determined at step S1012 that the display instruction has not been received from the terminal apparatus 400 (NO at step S1012), the ledger sheet recognizing unit 270 stands by until the display instruction is received. If the receipt of the display instruction is not determined at step S1012, the ledger sheet recognizing unit 270 may complete the process thereof.

If it is determined at step S1012 that the display instruction has been received from the terminal apparatus 400 (YES at step S1012), the output unit 279 causes the terminal apparatus 400 to display the list screen displaying the list of invoice management information items, which is generated by the display screen generating unit 278 with the invoice management information (step S1013). Then, the ledger sheet recognizing unit 270 completes the process thereof.

The acquisition of the recognition result data will be described with reference to FIG. 11.

FIG. 11 is a diagram illustrating the acquisition of the recognition result data. Information 151 illustrated in FIG. 11 represents a result of character recognition performed on the ledger sheet image data by the character recognizing unit 275.

The information 151 is an example of information extracted from the recognition result of the characters in the character fields clipped from the invoice and the coordinates representing the positions of the characters.

The character recognizing unit 275 of the first embodiment recognizes a character string by connecting neighboring characters. Specifically, the character recognizing unit 275 may recognize one word as a combination of characters separated from each other by a distance equal to or less than the length of a predetermined number of pixels.

Information 152 illustrated in FIG. 11 represents the character strings recognized by the character recognizing unit 275 and the areas of the character strings. The information 152 is an example of the reading result data of the ledger sheet image read by the character recognizing unit 275.

The character recognizing unit 275 further recognizes each of areas of the ledger sheet image data divided by vertical lines and horizontal lines as one cell, and assigns, to each cell, identification information for identifying the cell (i.e., a cell ID).

Information 153 illustrated in FIG. 11 represents the association between the respective areas (i.e., cells) recognized in the ledger sheet image data and the respective cell IDs. The example of the information 153 indicates that the area in which a keyword "company ca" is recognized corresponds to a cell with a cell ID "2." The keyword "company ca" is therefore associated with the cell ID "2" as a keyword included in the invoice. The example of the information 153 further indicates that a cell ID "7" and a keyword "invoice issuer" are associated with each other.

The ledger sheet recognizing unit 270 of the first embodiment thus associates each keyword with the corresponding cell based on the ledger sheet image data. Further, in the first embodiment, the ledger sheet recognizing unit 270 extracts the item names and the item values from the ledger sheet image data and generates the recognition result data based on the relative positions of the keywords with reference to the ledger sheet definition information.

Information 154 illustrated in FIG. 11 is an example of the recognition result data. It is understood from the example of the information 154 in FIG. 11 that the keyword "invoice issuer" is extracted from the ledger sheet image data as the item name, and that the keyword "company ca" is extracted from the ledger sheet image data as the item value corresponding to the item name. It is also understood from the example of the information 154 that a keyword "date of invoice" is extracted from the ledger sheet image data as the item name, and that a keyword "Sep 3, 2019" is extracted from the ledger sheet image data as the item value corresponding to the item name.

The invoice management DB 260 of the first embodiment will be described with reference to FIG. 12.

FIG. 12 is a diagram illustrating an example of the invoice management DB 260 of the first embodiment. The invoice management DB 260 of the first embodiment stores the invoice management information generated by the process of the ledger sheet recognizing unit 270.

The invoice management DB 260 includes information items: " ID," "invoice issuer," "billing amount," "date of invoice," "date and time of registration," "status," "total item price," "image file path," "invoice number," and "item information." In the invoice management DB 260, the item "ID" and the other items are associated with each other. In the following description of the invoice management DB 260, information including the value of the item "ID" and the values of the other items will be described as the invoice management information.

The value of the item "ID" is identification information for identifying the invoice management information. The value of the item "invoice issuer" represents the name of the organization that has issued the invoice. That is, the value of the item "invoice issuer" is information for identifying the invoice issuer.

The value of the item "billing amount" represents the billing amount extracted from the recognition result data. The value of the item "date of invoice" represents the date of invoice extracted from the recognition result data. In the first embodiment, the date of invoice is an example of the date of issuance of the ledger sheet.

The value of the item "date and time of registration" represents the date and time when the ledger sheet image data of the invoice is stored in the ledger sheet image DB 230. The value of the item "status" represents the progress of the recognition of the ledger sheet image. Herein, the value of the item "status" is the same as that in the job list 101 (see FIG. 9).

The value of the item "total item price" represents the sum of prices included in the item information extracted from the recognition result data. The value of the item "image file path" represents the storage location of the ledger sheet image data in the ledger sheet image DB 230.

The value of the item "invoice number" represents the invoice number extracted from the recognition result data. The value of the item "item information" represents the item information extracted from the recognition result data. The item information refers to information that associates the name of an item described in an item section of the ledger sheet with the value of the item, for example. The item section of the ledger sheet is a section including a data aggregation result, for example. In the item section, data of the same format is repeatedly printed vertically for each item.

In the first embodiment, information items of the invoice management information such as "invoice issuer," "billing amount," "date of invoice," "total item price," "invoice number," and "item information," for example, may be extracted from the recognition result data as the attribute information of the invoice.

Further, in the first embodiment, information items of the invoice management information such as " ID," "date and time of registration," "status," and "image file path," for example, may be provided by the management information generating unit 277 when the ledger sheet recognizing unit 270 processes the invoice.

For example, in the example of FIG. 12, the management information generating unit 277 extracts an invoice issuer "COMPANY CA," a billing amount "54,000," a date of invoice "Sep. 3, 2019," a total item price "38,200," and item information "1. RECEPTION TABLE: aaa YEN . . . " from the recognition result data as the attribute information of the invoice.

The management information generating unit 277 then assigns the ID, the date and time of registration, the status, and the image file path to the attribute information of the invoice.

In the first embodiment, the attribute information of the invoice is thus associated with the image file path as the storage location of the ledger sheet image data, to thereby generate the invoice management information associating the attribute information of the invoice with the ledger sheet image data.

In the following description, the invoice management information for each ID in the invoice management DB 260 may be described as one record.

An example of the display of the terminal apparatus 400 will be described with reference to FIG. 13.

FIG. 13 is a diagram illustrating an example of the display of the terminal apparatus 400. FIG. 13 illustrates a screen 131 as an example of the list screen displayed on the terminal apparatus 400 at step S723 in FIG. 7B.

The screen 131 includes a display field 132 for displaying the list of invoice management information items and an operation button 133 for instructing to combine invoices. The display field 132 includes selection checkboxes for respective records. In the example of FIG. 13, a record 132a corresponding to the invoice issuer "company ca" is selected.

In the first embodiment, if the operation button 133 is operated when the record 132a is selected on the screen 131, the combining unit 290 of the server 200 executes a process of identifying the candidate invoices to be combined with the invoice represented by the record 132a.

The process of the combining unit 290 in the server 200 of the first embodiment will be described with reference to FIGS. 14A and 14B.

Figure 14B:
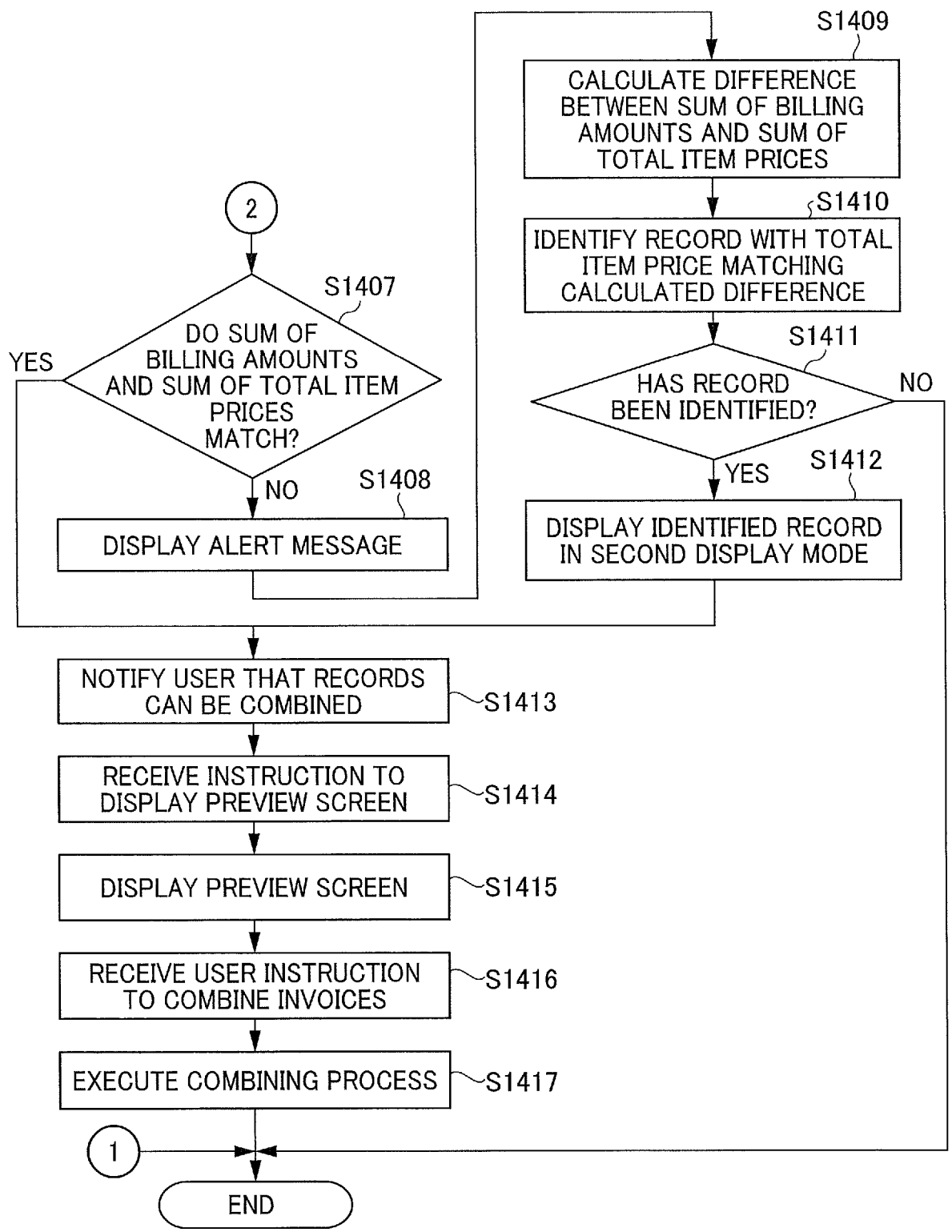

FIGS. 14A and 14B a flowchart illustrating the process of the combining unit 290 of the first embodiment.

The combining unit 290 of the first embodiment receives the selection of a record on the list screen (step S1401), and the candidate identifying unit 292 identifies a set of records that has the item "status" set to the value "unprocessed" and meets the candidate condition held in the condition holding unit 291 (step S1402).

That is, the candidate identifying unit 292 identifies a combination of invoice management information items having the item "status" set to the value "unprocessed" and meeting the candidate condition.

In the first embodiment, the candidate invoices to be combined are thus identified among the records with the item "status" set to the value "unprocessed." Consequently, the recognition result data in the saved-as-draft, confirmed, or combined status is prevented from being erroneously combined with other recognition result data.

The candidate condition of the first embodiment will be described.

The candidate condition of the first embodiment is determined with items included in the attribute information forming part of the invoice management information. The items included in the attribute information include the invoice issuer, the billing amount, the date of invoice, the date and time of registration, and the total item price, for example.

Specifically, the candidate condition includes matching the selected record in the value of the item "invoice issuer" (a first candidate condition), matching the selected record in both the value of the item "invoice issuer" and the value of the item "date of invoice" (a second candidate condition), and matching the selected record in the value of the item "invoice issuer" and having the item "date and time of registration" with a value (i.e., date and time) within 24 hours after the date and time of registration of the selected record (a third candidate condition). Herein, the invoice issuer is an example of a ledger sheet issuer.

The condition holding unit 291 of the first embodiment holds information representing the above-described candidate conditions. In the condition holding unit 291 of the first embodiment, one of the plurality of candidate conditions may be previously set as the candidate condition to be referred to by the candidate identifying unit 292. Further, in the first embodiment, a setting screen for setting the candidate condition may be displayed on a terminal apparatus used by the administrator of the ledger sheet recognition system 100, for example.

If the second candidate condition is set, for example, the candidate identifying unit 292 refers to the invoice management DB 260 at step S1402, and identifies a set of records (i.e., invoice management information items) having the item "status" set to the value "unprocessed" and matching the selected record in both the value of the item "invoice issuer" and the value of the item "date of invoice."

In the first embodiment, any particular candidate condition may not be set. In this case, the candidate identifying unit 292 may identify the records for each of the plurality of candidate conditions held in the condition holding unit 291.

Further, the candidate identifying unit 292 may identify plural sets of records meeting a certain candidate condition. Specifically, if the operation button 133 in FIG. 13 is operated when no record is selected, for example, the candidate identifying unit 292 may identify plural sets of records meeting the candidate condition.

Then, the combining unit 290 determines whether a set of records has been identified by the candidate identifying unit 292 (step S1403). If no set of records has been identified at step S1403, it indicates that there is no invoice management information meeting the second candidate condition; there is no invoice to be combined.

If no set of records has been identified at step S1403 (NO at step S1403), therefore, the combining unit 290 completes the process thereof.

If a set of records has been identified at step S1403 (YES at step S1403), the display control unit 294 of the combining unit 290 causes the terminal apparatus 400 to display the identified records on the list screen in a display mode different from a display mode for displaying the other records (step S1404). In the following description, the display mode of the records identified at step S1403 may be described as the first display mode.

The combining unit 290 then receives user selection of records from the identified records on the list screen (step S1405), and the combining unit 293 acquires the value of the item "billing amount" and the value of the item "total item price" from each of the selected records (step S1406).

The combining unit 293 then determines whether the sum of the values of the item "billing amount" of the records matches the sum of the values of the item "total item price" (step S1407).

If it is determined at step S1407 that the sum of the values of the item "billing amount" of the records matches the sum of the values of the item "total item price" (YES at step S1407), the combining unit 290 proceeds to step S1413, which will be described later.

If it is determined at step S1407 that the sum of the values of the item "billing amount" of the records does not match the sum of the values of the item "total item price" (NO at step S1407), the display control unit 294 of the combining unit 290 causes the terminal apparatus 400 to display an alert message notifying that the sum of the billing amounts does not match the sum of the total item prices (step S1408).

Then, the candidate identifying unit 292 of the combining unit 290 calculates the difference between the sum of the billing amounts and the sum of the total item prices (step S1409). The candidate identifying unit 292 then identifies a record that is in the unprocessed status and has the value of the item "total item price" matching the calculated difference (step S1410).

The combining unit 290 then determines whether the record has been identified at step S1410 (step S1411). If it is determined at step S1411 that the record has not been identified at step S1410 (NO at step S1411), the combining unit 290 completes the process thereof.

If it is determined at step S1411 that the record has been identified at step S1410 (YES at step S1411), the display control unit 294 of the combining unit 290 causes the terminal apparatus 400 to display the record identified at step S1410 on the list screen in a display mode different from a display mode for displaying the other records (step S1412).

In the first embodiment, the display mode of the record identified at step S1410 may be described as the second display mode. The display control unit 294 of the first embodiment may make the first display mode and the second display mode different from each other.

The combining unit 290 then notifies the user that it is possible to combine the selected records (step S1413). Specifically, the display control unit 294 of the combining unit 290 may cause the terminal apparatus 400 to display information notifying that it is possible to combine the selected records.

Then, the combining unit 290 receives an instruction from the terminal apparatus 400 to display a preview screen (step S1414), and the display control unit 294 causes the terminal apparatus 400 to display a preview screen of the invoices corresponding to the selected records (step S1415). That is, the display control unit 294 causes the terminal apparatus 400 to display the preview screen of the candidate invoices to be combined.

The combining unit 290 then receives an instruction to combine the invoices (step S1416), and the combining unit 293 executes a combining process (step S1417). Then, the combining unit 290 completes the process thereof.

Examples of the display of the terminal apparatus 400 will be described with reference to FIGS. 15 to 18.

FIG. 15 is a diagram illustrating an example of the display of the terminal apparatus 400 of the first embodiment.

FIG. 15 illustrates a screen 131A as an example of the screen displayed on the terminal apparatus 400 at step S1404 in FIG. 14A.

If the operation button 133 is operated when the record 132a is selected, a record 132b is identified as a record being in the unprocessed status and meeting the second candidate condition, and the records 132a and 132b are displayed on the screen 131A in the first display mode.

In the first display mode, the records 132a and 132b may be displayed with a background different in color from a background of the other records in the list of invoice management information items displayed in the display field 132, for example. Further, in the first display mode, the records 132a and 132b in the list of invoice management information items displayed in the display field 132 may be displayed as enclosed by thick lines, for example. The first display mode may be any display mode in which the identified record is displayed distinguishably from the other records.

When the set of the records 132a and 132b is selected on the screen 131A, the combining unit 290 calculates the sum of the billing amounts of the records 132a and 132b and the sum of the total item prices of the records 132a and 132b.

Herein, the record 132a is the invoice management information with an ID "1," and the record 132b is the invoice management information with an ID "4," as illustrated in FIG. 12. The combining unit 290 therefore calculates the sum of the billing amount in the invoice management information with the ID "1" and the billing amount in the invoice management information with the ID "4." The combining unit 290 further calculates the sum of the total item price in the invoice management information with the ID "1" and the total item price in the invoice management information with the ID "4."

The billing amount in the invoice management information with the ID "1" is "54,000," and the billing amount in the invoice management information with the ID "4" is "0."

The sum of the billing amount in the invoice management information with the ID "1" and the billing amount in the invoice management information with the ID "4" is therefore "54,000."

Further, the total item price in the invoice management information with the ID "1" is "38,200," and the total item price in the invoice management information with the ID "4" is "15,800." The sum of the total item price in the invoice management information with the ID "1" and the total item price in the invoice management information with the ID "4" is therefore "54,000," which matches the sum of the billing amounts.

The combining unit 290 therefore notifies the user that it is possible to combine the above-described invoice management information items. Specifically, the combining unit 290 may cause the terminal apparatus 400 to display, on the screen 131A, a window including information indicating that it is possible to combine the records 132a and 132b and an operation button for instructing to display the preview screen, for example.

If the instruction to display the preview screen is input on the screen 131A, the combining unit 290 causes the terminal apparatus 400 to display the preview screen of the invoices corresponding to the identified records.

Figure 16:
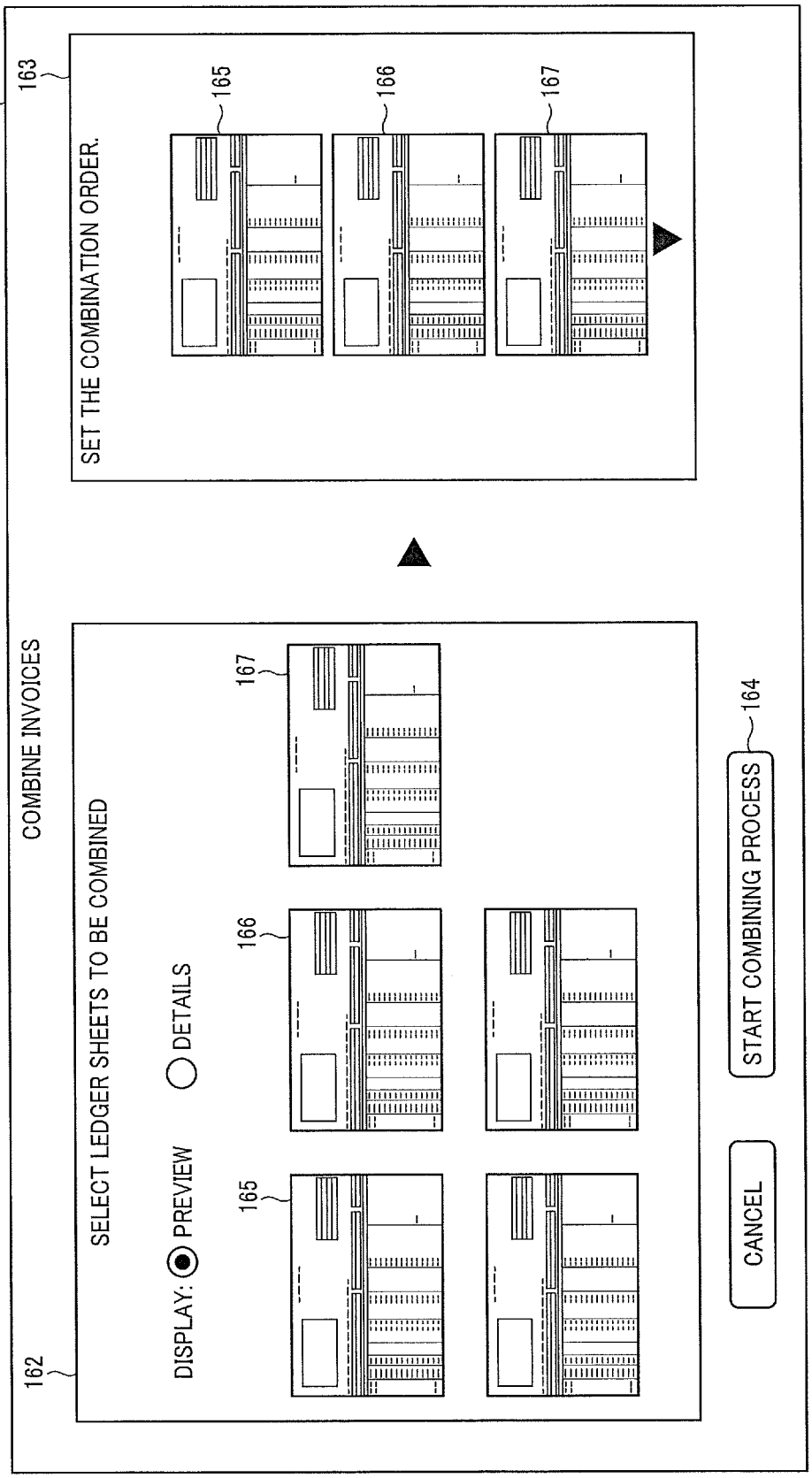

FIG. 16 is a diagram illustrating an example of the display of the terminal apparatus 400 of the first embodiment. FIG. 16 illustrates a screen 161 as an example of the preview screen displayed on the terminal apparatus 400 at step S1415 in FIG. 14B.

The screen 161 includes a display field 162 (an example of a first display field), a display field 163 (an example of a second display field), and an operation button 164, for example. The display field 162 displays preview images of the candidate invoices to be combined, which are identified by the candidate identifying unit 292.

The display filed 163 displays preview images of the invoices to be combined. That is, the display field 163 displays the preview images of the invoices selected from the candidate invoices in the display field 162 as the invoices to be actually combined. These preview images are generated from the ledger sheet image data read from the selected invoices. That is, the preview images are images generated from the ledger sheet image data read from the invoices (i.e., ledger sheets).

In the first embodiment, in response to an operation of selecting one of the preview images displayed in the display field 162 and moving the selected preview image to the display field 163, for example, the selected preview image is displayed in the display field 163.

Specifically, for example, one of the preview images displayed in the display field 162 may be moved to the display field 163 by a drag-and-drop operation performed by the user of the terminal apparatus 400.

In the first embodiment, the combination order of the invoices may be determined by an operation such as changing the arrangement order of the preview images displayed in the display field 163.

In the example of FIG. 16, the display field 162 displays five preview images including preview images 165, 166, and 167, and the display field 163 displays the preview images 165, 166, and 167. The example of FIG. 16 therefore indicates that the invoices corresponding to the preview images 165, 166, and 167 are selected as the invoices to be combined from the candidate invoices to be combined, which are identified by the candidate identifying unit 292.

In the example of FIG. 16, the display field 163 displays the preview images 165, 166, and 167 in this order from above, and the invoices corresponding to the preview images 165, 166, and 167 are combined in accordance with this display order.

In response to the operation of the operation button 164 on the screen 161, the combining unit 290 receives the instruction to execute the combining process, and combines the ledger sheet image data items of the invoices corresponding to the preview images 165, 166, and 167 displayed in the display field 163.

As described above, according to the first embodiment, the ledger sheet images of the candidate invoices considered as forming the same invoice are selected from the ledger sheet image data in the ledger sheet image DB 230 and presented to the user of the terminal apparatus 400. Further, in the case of a multiple-page invoice, the first embodiment enables the user of the terminal apparatus 400 to set the order of combining the pages of the invoice. The first embodiment therefore facilitates for the user of the terminal apparatus 400 to manage the multiple-page ledger sheet.

Figure 17:
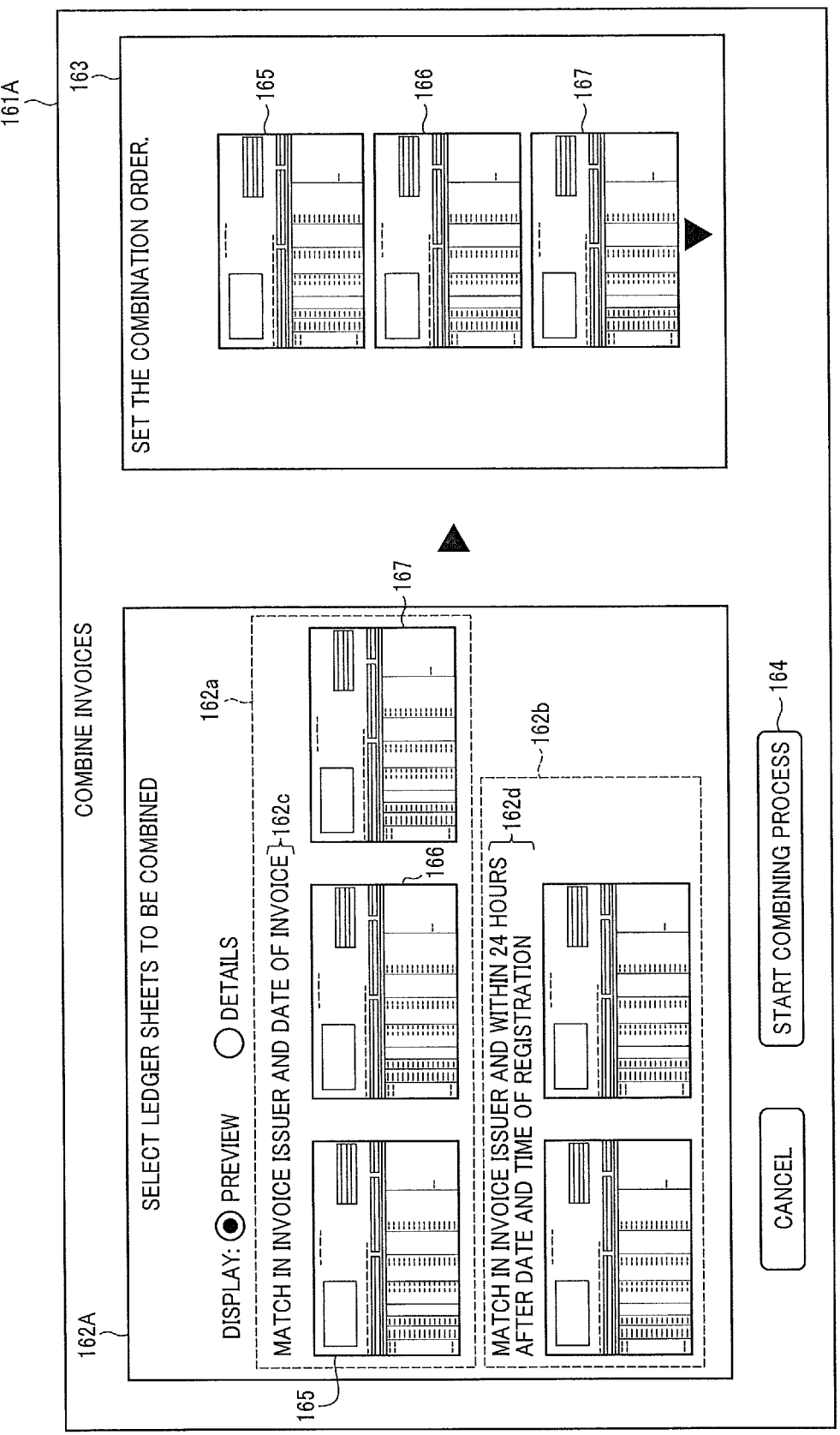

FIG. 17 is a diagram illustrating an example of the display of the terminal apparatus 400 of the first embodiment. FIG. 17 illustrates a screen 161A as another example of the preview screen displayed on the terminal apparatus 400 at step S1415 in FIG. 14B.

The screen 161A illustrated in FIG. 17 includes a display field 162A that displays, for each of candidate conditions, the preview images of the invoices corresponding to the identified records.

The display field 162A includes areas 162a and 162b. The area 162a displays the preview images of the invoices corresponding to the records identified based on the second candidate condition. The area 162b displays the preview images of the invoices corresponding to the records identified based on the third candidate condition.

Further, the area 162a displays information 162c representing the second candidate condition, and the area 162b displays information 162d representing the third candidate condition.

The first embodiment thus enables the preview images of the identified invoices to be displayed as sorted by the candidate condition.

The first embodiment further enables the user to select, from both the preview images displayed in the area 162a and the preview images displayed in the area 162b as the preview images displayed in the display field 162A, the preview images to be moved to the display field 163.

FIG. 18 is a diagram illustrating an example of the display of the terminal apparatus 400 of the first embodiment. FIG. 18 illustrates a screen 131B as an example of the screen displayed at step S1412 in FIG. 14B.

FIG. 18 illustrates a case in which a set of the record 132a and a record 132c is selected at step S1405 in FIG. 14A. In this case, the candidate identifying unit 292 calculates the sum of the billing amounts of the records 132a and 132c and the sum of the total item prices of the records 132a and 132c.

Herein, the record 132a is the invoice management information with the ID "1," and the record 132c is the invoice management information with an ID "6," as illustrated in FIG. 12. Therefore, the billing amount in the invoice management information with the ID "1" is "54,000," and the billing amount in the invoice management information with the ID "6" is "11,000." The sum of the billing amount in the invoice management information with the ID "1" and the billing amount in the invoice management information with the ID "6" is therefore "65,000."

Further, the total item price in the invoice management information with the ID "1" is "38,200," and the total item price in the invoice management information with the ID "6" is "11,000." The sum of the total item price in the invoice management information with the ID "1" and the total item price in the invoice management information with the ID "6" is therefore "49,200," which does not match the sum of the billing amounts.

Therefore, the combining unit 290 causes the terminal apparatus 400 to display, on the screen 131B, an alert message notifying that the sum of the total item prices and the sum of the billing amounts do not match.

Further, the candidate identifying unit 292 identifies, among the records in the invoice management DB 260, a record being in the unprocessed status and having a total item price of "15,800," i.e., the difference between "65,000" and "49,200." Specifically, the candidate identifying unit 292 identifies the record 132b. i.e., the invoice management information with the ID "4."

The thus-identified record 132b with the ID "4" is displayed on the screen 131B in the second display mode different from the display mode for displaying the records 132a and 132c.

Specifically, the record 132b is displayed in a display mode different from the first display mode used to display the records 132a and 132c and also different from a display mode used to display the other records not identified by the candidate identifying unit 292.

In the first embodiment, it is thus determined whether the sum of the billing amounts and the sum of the total item prices match between the plurality of invoices selected as the candidate invoices to be combined. Then, if it is determined that the sum of the billing amounts and the sum of the total item prices do not match between the plurality of invoices, it is determined that there may be a missing invoice to be combined, and the record corresponding to the missing invoice is identified and presented to the user.

FIG. 19 is a diagram illustrating an example of the display of the terminal apparatus 400 of the first embodiment. FIG. 19 illustrates a screen 131C as an example of the screen displayed at step S1404 in FIG. 14A.

The screen 131C illustrated in FIG. 19 is an example of the screen displayed when the operation button 133 is operated without the selection of a record on the screen 131 in FIG. 13. It is assumed here that the second candidate condition has been set.

In this case, the candidate identifying unit 292 identifies, among the records in the invoice management DB 260, all sets of records meeting the second candidate condition. The second candidate condition is the matching in the invoice issuer and the date of invoice. The candidate identifying unit 292 therefore identifies, among the records (i.e., the invoice management information items) stored in the invoice management DB 260, the record 132a with the ID "1" and the record 132b with the ID "4" as a first set of records (see FIG. 12). The candidate identifying unit 292 further identifies a record 132e with an ID "3" and a record 132f with an ID "5" as a second set of records.

After the sets of records are identified, the display control unit 294 of the combining unit 290 changes the display mode of the records included in the identified sets of records on the screen 131C.

On the screen 131C, the background color is set differently between the records 132a and 132b included in the first set of records and the records 132e and 132f included in the second set of records.

In the first embodiment, the display mode of the records included in the sets of records is thus set differently between the sets of records on the list screen, to thereby facilitate for the user to recognize that plural sets of records have been identified.

The combining process of the combining unit 290 of the first embodiment will be described with reference to FIG. 20.

FIG. 20 is a diagram illustrating an example of the invoice management DB 260 of the first embodiment.

In the combining unit 290 of the first embodiment, in response to receipt of the instruction to execute the combining process, the combining unit 293 sets the status of the records included in the set of records corresponding to the instruction to execute the combining process to "combined," and generates a new record combining the records included in the set of records. The combining unit 293 then adds the generated new record to the invoice management DB 260.

In the example of the invoice management DB 260 illustrated in FIG. 20, the instruction to execute the combining process on the set of the record with the ID "1" and the record with the ID "4."

In this case, the combining unit 293 of the combining unit 290 sets the status of the record with the ID "1" and the record with the ID "4" to "combined." The combining unit 293 further generates a record with an ID "7" as a new record combining the record with the ID "1" and the record with the ID "4."

In the record with the ID "7," the value of the item "billing amount" corresponds to the sum of the billing amount in the record with the ID "1" and the billing amount in the record with the ID "4." Further, the respective values of the items "invoice issuer" and "date of invoice" in the record with the ID "7" are the same as those in the record with the ID "1" and the record with the ID "4."

Further, the value of the item "date and time of registration" in the record with the ID "7" represents the date and time when the record with the ID "7" is generated and stored in the invoice management DB 260.

Immediately after the generation of the record with the ID "7," the value of the item "status" in the record with the ID "7" is "unprocessed." In the first embodiment, the value of the item "status" in a newly generated record may also include information indicating that the generated record is a combination of other records.

In the example of FIG. 20, the value of the item "status" in the record with the ID "7" includes information indicating that the record is a result of combining the record with the ID "1" and the record with the ID "4."

In the record with the ID "7," the value of the item "total item price" corresponds to the sum of the total item price in the record with the ID "1" and the total item price in the record with the ID "4."

In the record with the ID "7," the value of the item "image file path" includes the storage location included in the record with the ID "1" and the storage location included in the record with the ID "4." Further, in the record with the ID "7," the value of the item "item information" includes the item information included in the record with the ID "1" and the item information included in the record with the ID "4."

The combining unit 293 of the first embodiment thus generates one record including the ledger sheet image data items associated with the plurality of records included in the set of records corresponding to the instruction to execute the combining process.

In the first embodiment, a plurality of ledger sheet image data items are associated with each other as the same invoice with the above-described combining process.

The first embodiment therefore prevents the respective ledger sheet image data items of a plurality of pages of a multiple-page ledger sheet from being recognized as the ledger sheet image data items of separate ledger sheets, thereby enabling correct recognition of the multiple-page ledger sheet.

The above-described server 200 of the first embodiment acquires the ledger sheet image data through the scanning of the ledger sheet by the image forming apparatus 300. The acquisition of the ledger sheet image data, however, is not limited thereto. For example, the server 200 may receive the ledger sheet image data from another apparatus such as the terminal apparatus 400.

FIG. 21 is a diagram illustrating an example of the display of the terminal apparatus 400 of the first embodiment. FIG. 21 illustrates a screen 131D as an example of the list screen displayed after the execution of the combining process. The screen 131D illustrated in FIG. 21 is displayed with reference to the invoice management DB 260 illustrated in FIG. 20.

The screen 131D includes a display field 132A, in which the status of the records 132a and 132b is described as "COMBINED." That is, information indicating that the records 132a and 132b have been combined is displayed as the status of the records 132a and 132b.

Further, the display field 132A includes a newly added record 132g, which corresponds to the record with the ID "7" generated by the combining process.

In the record 132g, information "COMBINING RESULT (IDS: 1, 4)" indicating that the record 132g has been generated by the combining process and information indicating that the record 132g is in the unprocessed status are displayed as the status of the record 132g.

In the first embodiment, the list screen thus displays, as the status of a record, the information indicating that the combining process has been executed on the record and the information indicating that the record is a result of the combining process.

In the first embodiment, in response to selection of the record 132g on the screen 131D, a recognition result check screen for checking the recognition result data corresponding to the record 132g may be displayed. The recognition result check screen may display all ledger sheet image data items associated with the record 132g.

The first embodiment therefore facilitates for the user of the terminal apparatus 400 to recognize the combined records and the record generated by the combining process.

Figure 22:
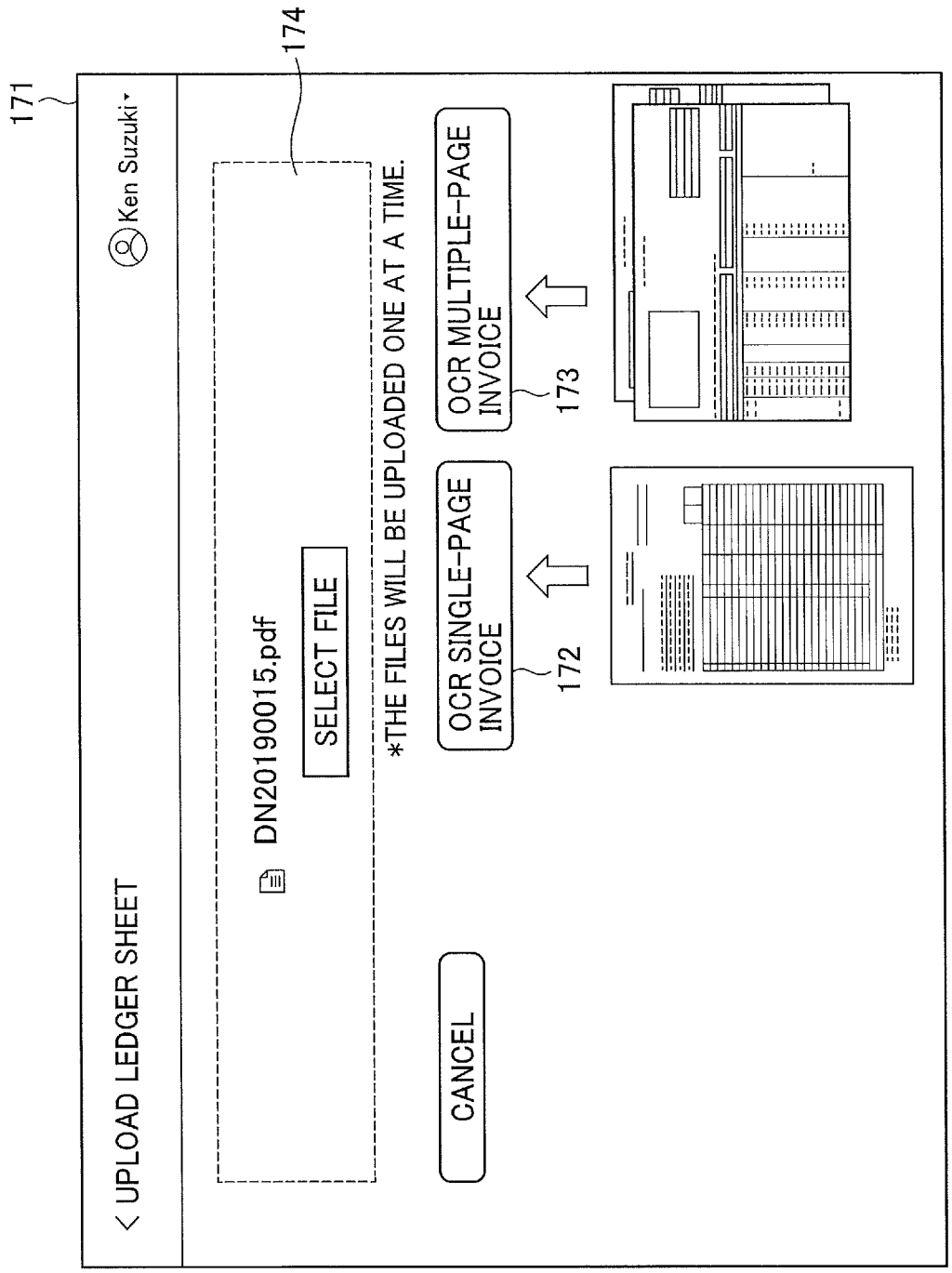

FIG. 22 is a diagram illustrating an example of the display of the terminal apparatus 400 of the first embodiment. FIG. 22 illustrates a screen 171 as an example of the screen displayed on the terminal apparatus 400 when the ledger sheet image data is transmitted to the server 200 from the terminal apparatus 400.

The screen 171 includes operation buttons 172 and 173 and a display field 174. The operation button 172 is operated to select the first recognition mode for transmitting, to the server 200, the ledger sheet image data of a single-page invoice obtained by scanning one page of the invoice and the instruction to execute the character recognition on the ledger sheet image data of the page.

The operation button 173 is operated to select the second recognition mode for transmitting, to the server 200, the ledger sheet image data of a multiple-page invoice obtained by batch scanning a plurality of pages of the invoice and the instruction to execute the character recognition on the ledger sheet image data of the plurality of pages.

The display field 174 displays information such as the file name of the ledger sheet image data to be transmitted to the server 200.

The first embodiment thus enables the ledger sheet image data to be uploaded to the server 200 from a typical information processing apparatus such as the terminal apparatus 400. The ledger sheet recognition system 100 of the first embodiment therefore may not include the image forming apparatus 300.

Further, in the first embodiment, the selection between the first recognition mode and the second recognition mode may be executed on the image forming apparatus 300 or the terminal apparatus 400.

If the data of a multiple-page invoice is transmitted to the server 200 in the second recognition mode and a page to be added to the invoice is found after the transmission of the data, for example, the additional page may be transmitted to the server 200 in the first recognition mode. Then, the combining unit 290 of the server 200 may combine the ledger sheet image data of the multiple-page invoice transmitted in the second recognition mode with the ledger sheet image data of the single-page invoice transmitted in the first recognition mode.

As described above, according to the first embodiment, the ledger sheet image data of a multiple-page invoice obtained by batch scanning a plurality of pages of the invoice is combined with the ledger sheet image data of a single-page invoice obtained by scanning one page of the invoice, to thereby form one invoice. According to the first embodiment, therefore, even if there is a page left out from batch scanning or forgotten to be scanned, for example, the combining unit 290 is capable of combining the ledger sheet image data of such a page with the ledger sheet image data that should be associated with the page. Consequently, the time and effort for managing the multiple-page ledger sheet is reduced.

A second embodiment of the present invention will be described below with drawings.

The second embodiment is different from the first embodiment in that the combining process is executed on the recognition result check screen. The following description of the second embodiment will therefore focus on differences from the first embodiment. Further, component of the second embodiment similar in function to those of the first embodiment will be denoted with the same reference numerals as those used in the first embodiment, and description thereof will be omitted.

Figure 23:
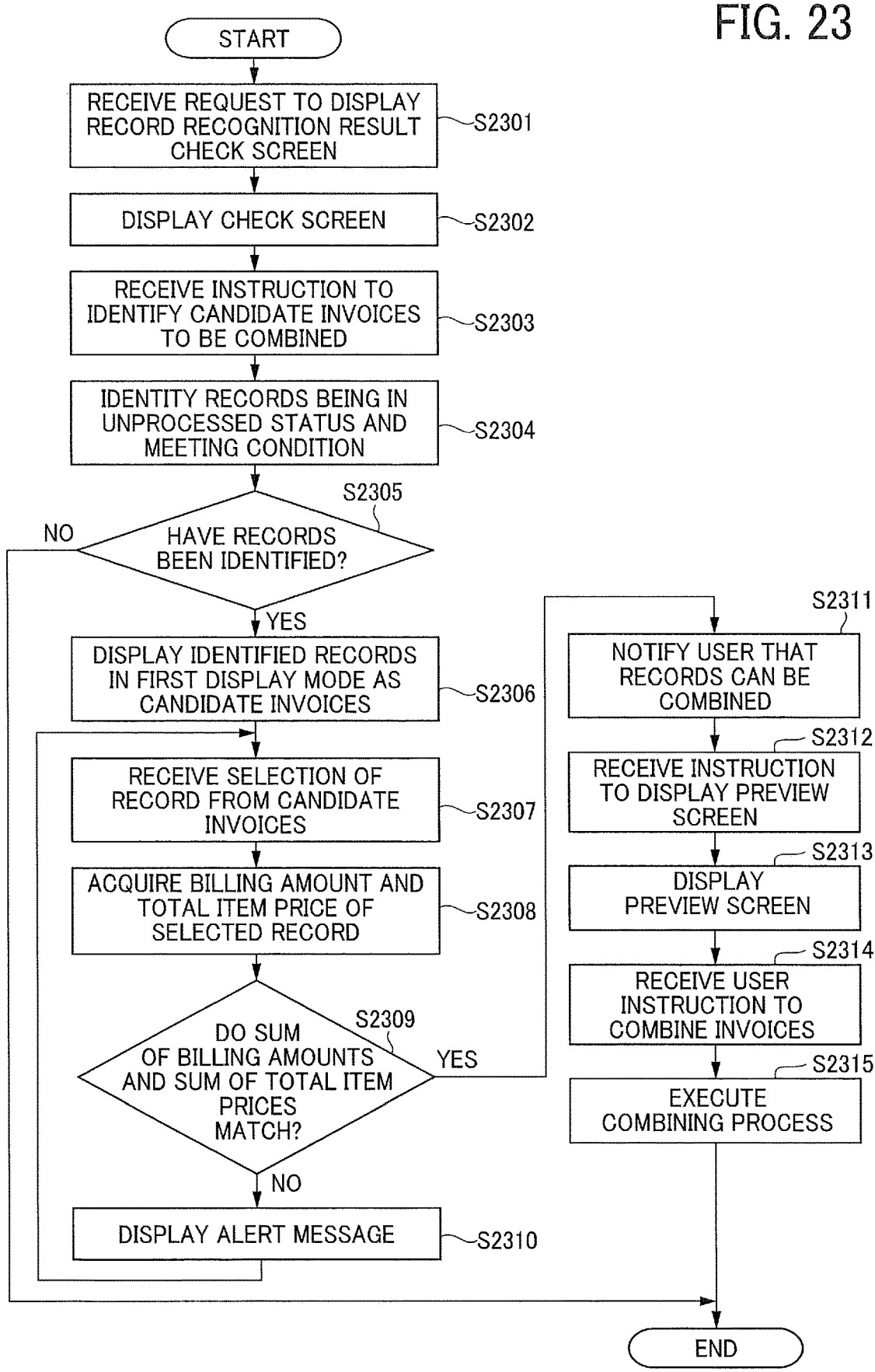
FIG. 23 is a flowchart illustrating a process of the combining unit of the server of a second embodiment of the present invention.

FIG. 23 is a flowchart illustrating a process of the combining unit 290 of the second embodiment. In the server 200 of the second embodiment, the combining unit 290 receives, on the list screen displayed at step S723 in FIG. 7B, a request to display the recognition result check screen for checking the recognition result of a record (step S2301).

Specifically, with the receipt of selection of a record in the display field 132 on the screen 131 illustrated in FIG. 13, the server 200 determines that the request to display the recognition result check screen for checking the recognition result of the record has been received.

Then, the server 200 causes the terminal apparatus 400 to display the recognition result check screen for checking the recognition result of the selected record, which is generated by the display screen generating unit 278 of the ledger sheet recognizing unit 270 (step S2302). The server 200 then receives, on the recognition result check screen, the instruction to execute the process of identifying the candidate invoices to be combined (step S2303).

In the server 200, in response to receipt of the instruction, the candidate identifying unit 292 of the combining unit 290 identifies, based on the set candidate condition and the information for identifying the invoice issuer displayed on the recognition result check screen, records being in the unprocessed status and meeting the candidate condition (step S2304). The candidate invoices identified in this step are the candidate invoices to be combined with the record, the recognition result of which is displayed on the recognition result check screen.

Then, in the combining unit 290, the candidate identifying unit 292 determines whether the records have been identified (step S2305). If it is determined at step S2305 that the records have not been identified (NO at step S2305), the combining unit 290 completes the process thereof.

If it is determined at step S2305 that the records have been identified (YES at step S2305), the display control unit 294 of the combining unit 290 causes the terminal apparatus 400 to display the list screen and display the identified records on the list screen in the first display mode (step S2306).

Then, the combining unit 290 receives selection of a record from the identified records on the list screen (step S2307), and the combining unit 293 acquires the value of the item "billing amount" and the value of the item "total item price" from the selected record (step S2308).

The combining unit 293 then determines whether the sum of the billing amount in the record selected at step S2301 and the billing amount in the record acquired at step S2308 matches the sum of the total item price in the record selected at step S2301 and the total item price in the record acquired at step S2308 (step S2309).

If it is determined at step S2309 that the sum of the billing amounts does not match the sum of the total item prices (NO at step S2309), the display control unit 294 of the combining unit 290 causes the terminal apparatus 400 to display an alert message notifying that the sum of the billing amounts does not match the sum of the total item prices (step S2310), and the combining unit 290 returns to step S2307.

If it is determined at step S2309 that the sum of the billing amounts matches the sum of the total item prices (YES at step S2309), the combining unit 290 proceeds to step S2311. The processes of steps S2311 to S2315 are similar to those of steps S1413 to S1417 in FIG. 14B, and thus description thereof will be omitted.

In the second embodiment described above, if it is determined at step S2309 that the sum of the billing amounts does not match the sum of the total item prices, the alert message is transmitted to the terminal apparatus 400, and the process of the combining unit 290 is completed. The process of the combining unit 290, however, is not limited thereto. In the second embodiment, if it is determined at step S2309 that the sum of the billing amounts does not match the sum of the total item prices, the transmission of the alert message may be followed by the processes of step S1409 and the subsequent steps.

An example of the display of the terminal apparatus 400 of the second embodiment will be described with reference to FIG. 24.

FIG. 24 is a diagram illustrating an example of the display of the terminal apparatus 400 of the second embodiment. FIG. 24 illustrates a screen 181 including display fields 21, 22, 23, and 24, an input field 25, and operation buttons 26, 27, and 182.

The display field 21 displays the ledger sheet image represented by the ledger sheet image data. The display field 22 displays the status of the invoice management information associated with the ledger sheet image data. In the example of FIG. 24, the display field 22 displays the status "UNPROCESSED," indicating that the invoice management information associated with the ledger sheet image displayed in the display filed 21 is in the unprocessed status (i.e., the first status).

The display field 23 displays the invoice information acquired from the ledger sheet image displayed in the display field 21. The display filed 24 displays the item information acquired from the ledger sheet image displayed in the display field 21. Journal information based on the item information, for example, is input to the display field 25.

The operation button 26 is operated to change the status of the recognition result data displayed on the screen 181 to the saved-as-draft status. The operation button 27 is operated to change the status of the recognition result data displayed on the screen 181 to the confirmed status.

The operation button 182 is operated to instruct to execute the process of identifying the record corresponding to the recognition result data displayed on the screen 181 and the candidate records to be combined with the record of the displayed recognition result data. That is, the operation button 182 is operated to request the server 200 to execute the process of identifying the invoice management information items as the candidates to be combined with the invoice management information item (i.e., the record) extracted from the recognition result data displayed on the display screen 181.

In the second embodiment, in response to the operation of the operation button 182, the screen 181 may transition to a list screen in which the records meeting the candidate condition for the invoice issuer displayed in the display field 23 are displayed in the first display mode.

As described above, the second embodiment enables the user currently viewing the recognition result check screen to issue the instruction to identify the candidate invoices to be combined with the currently checked invoice. That is, the second embodiment enables the user to issue, directly from the recognition result check screen, i.e., without returning to the list screen from the recognition result check screen, the instruction to identify the candidate invoices to be combined with the currently checked invoice. The second embodiment therefore reduces the time and effort of returning to the list screen, thereby improving the operability.

The apparatuses described in each of the foregoing embodiments form one of a plurality of computing environments for implementing the embodiment disclosed in the present specification.

In an embodiment of the present invention, the server 200 includes a plurality of computing devices such as a server cluster. The plurality of computing devices are configured to communicate with each other via a desired type of communication link including a network or a shared memory, for example, to execute the processes disclosed in the present specification. Similarly, the server 200 may include a plurality of computing devices configured to communicate with each other.

The functions of the ledger sheet recognizing unit 270 and the combining unit 290 may be executed by the server 200. Further, the components of the server 200 may be divided and distributed to a plurality of devices.

The correspondence tables described in the specification may be generated by machine learning. Herein, machine learning refers to a technology for causing a computer to acquire learning ability similar to human learning ability. According to the technology, the computer autonomously generates, from previously learned data, algorithms for making decisions such as data identification, and makes predictions by applying the algorithms to new data. The learning method for machine learning may be any of supervised learning, unsupervised learning, semi-supervised learning, reinforcement learning, and deep learning, or may be a learning method combining two or more of these learning methods. The leaning method for machine learning is not limited to a particular method.

In each of the foregoing embodiments, information associating combined records with the candidate condition referred to to identify the records may be recorded, and the candidate condition may be weighted based on the recorded information, for example. In the embodiments, this process may be executed with machine learning. With the candidate condition thus weighted, a set of records likely to be subjected to the combining process is identified.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above-described steps are not limited to the order disclosed herein.

The invention claimed is:

1. An information processing system including at least one information processing apparatus, comprising circuitry configured to execute a record recognition process on image data that is obtained from a plurality of records by clipping characters from character fields while acquiring coordinates of the clipped characters and recognizing the characters separated from each other by a distance equal to or less than a length of a predetermined number of pixels as one character string;

extract information items including a billing amount and a total item price from a result of the record recognition process for each of the plurality of records, said billing amount representing a billing amount extracted from a record of the plurality of records, said total item price representing a sum of prices included in the record of the plurality of records;

cause a terminal apparatus to display a list screen on a display of the terminal apparatus, said list screen including a list of the plurality of records;

receive selections of a plurality of records within the list:

acquire a value of the billing amount and a value of the total item price from each of the plurality of records;

determine whether a sum of values of billing amounts of the plurality of records matches a sum of values of total item prices of the plurality of records as a condition;

display a notification that selected plurality of records can be combined upon determining that the condition is met, and a preview of a combined selected plurality of records; and display an alert that the condition is not met, calculate a difference between the sum of values of the billing amounts of the plurality of records and the sum of values of the total item prices of the plurality of records, and identify and display a record that has a value of a total item price matching the difference upon determining that the condition is not met, said record being displayed in a display mode that is different from a display mode of the selected plurality of records.

2. The information processing system of claim 1, wherein in response to receipt of an instruction to execute a process of combining the selected plurality of records, the circuitry combines the selected plurality of records.

3. The information processing system of claim 2, wherein the records are invoices, and wherein each of the records includes invoice information related to an invoice and image data that is read from the invoice, said invoice information and the image data being associated with each other.

4. The information processing system of claim 3, wherein the circuitry:
generates a new record based on the combined plurality of records and the invoice information, said invoice information being included in and associated with each of the combined plurality of the records, and
adds the new record to the list of the records.

5. The information processing system of claim 4, wherein each of the records includes a status representing progress of an record recognition that is executed on the image data, and
wherein the circuitry sets, in the list of the records, the status of the records corresponding to the combined plurality of the records, to a status indicating that the plurality of the records have been combined.

6. The information processing system of claim 5, wherein in response to selection of a record from the list of the records, the circuitry causes the terminal apparatus to display a check screen for checking a record recognition result from which the selected record is extracted, and
wherein in response to receipt of an instruction to identify the combination of the records, the circuitry identifies a combination of records including the selected records and meeting the condition.

7. The information processing system of claim 1, further comprising the terminal apparatus,
wherein the circuitry resides on an information processing apparatus included in the at least one information processing apparatus.

8. The information processing system of claim 1, wherein the circuitry is further configured to update an invoice management database by combining the selected records that satisfy the condition and generating a new record for the combined records in the invoice management database, said new record including an image file path of the combined records within the information processing system.

9. The information processing system of claim 1, wherein the circuitry is further configured to:
generate a machine learning model by recording information associating combined records with candidate conditions to identify the records and weighting the candidate conditions based on recorded information by machine learning through a learning method including at least one of supervised learning, unsupervised learning, semi-supervised learning, reinforcement learning, or deep learning,
identify a set of records to be combined by using the machine learning model, and
display the set of records in the list of the records.

10. An information processing method executed by an information processing apparatus, the information processing method comprising:
executing a record recognition process on image data that is obtained from a plurality of records by clipping characters from character fields while acquiring coordinates of the clipped characters and recognizing the characters separated from each other by a distance equal to or less than a length of a predetermined number of pixels as one character string;
extracting information items including a billing amount and a total item price from a result of the record recognition process for each of the plurality of records, said billing amount representing a billing amount extracted from a record of the plurality of records, said total item price representing a sum of prices included in the record of the plurality of records;
causing a terminal apparatus to display a list screen on a display of the terminal apparatus, said list screen including a list of the plurality of records;
receiving selections of a plurality of records within the list;
acquiring a value of the billing amount and a value of the total item price from each of the plurality of records;
determining whether a sum of values of billing amounts of the plurality of records matches a sum of values of total item prices of the plurality of records as a condition;
displaying a notification that selected plurality of records can be combined upon determining that the condition is met, and a preview of a combined selected plurality of records; and
displaying an alert that the condition is not met, calculating a difference between the sum of values of the billing amounts of the plurality of records and the sum of values of the total item prices of the plurality of records, and identifying and displaying a record that has a value of a total item price matching the difference upon determining that the condition is not met, said record being displayed in a display mode that is different from a display mode of the selected plurality of records.

11. The information processing method of claim 10, further comprising:
in response to receipt of an instruction to execute a process of combining the plurality of the records, combining the records.

12. The information processing method of claim 11, wherein the records are invoices,
the information processing method further comprising:
associating, in each of the records, invoice information related to the invoice with image data that is read from the invoice.

13. The information processing method of claim 12, further comprising:
generating a new record based on the combined plurality of the records and the invoice information, said invoice information being included in and associated with each of the combined plurality of the records; and
adding the new record to the list of the records.

14. The information processing method of claim 13, wherein each of the records includes a status representing progress of a record recognition that is executed on the image data,
the information processing method further comprising:
setting, in the list of the records, the status of the records corresponding to the combined plurality of the records, to a status indicating that the plurality of the records have been combined.

15. The information processing method of claim 14, wherein the displaying includes
in response to selection of a record from the list of the records, displaying a check screen for checking a record recognition result from which the selected record is extracted,
the information processing method further comprising:
in response to receipt of an instruction to identify the combination of the records, identifying a combination of records including the selected records and meeting the condition.

16. A non-transitory recording medium storing a plurality of instructions which, when executed by one or more processors, cause the processors to perform an image processing method comprising:
executing a record recognition process on image data that is obtained from a plurality of records by clipping characters from character fields while acquiring coordinates of the clipped characters and recognizing the characters separated from each other by a distance equal to or less than a length of a predetermined number of pixels as one character string;
extracting information items including a billing amount and a total item price from a result of the record recognition process for each of the plurality of records, said billing amount representing a billing amount extracted from a record of the plurality of records, said total item price representing a sum of prices included in the record of the plurality of records;
causing a terminal apparatus to display a list screen on a display of the terminal apparatus, said list screen including a list of records;
causing a terminal apparatus to display a list screen on a display of the terminal apparatus, said list screen including a list of the plurality of records;
receiving selections of a plurality of records within the list;
acquiring a value of the billing amount and a value of the total item price from each of the plurality of records;
determining whether a sum of values of billing amounts of the plurality of records matches a sum of values of total item prices of the plurality of records as a condition;
displaying a notification that selected plurality of records can be combined upon determining that the condition is met, and a preview of a combined selected plurality of records; and
displaying an alert that the condition is not met, calculating a difference between the sum of values of the billing amounts of the plurality of records and the sum of values of the total item prices of the plurality of records, and identifying and displaying a record that has a value of a total item price matching the difference upon determining that the condition is not met, said record being displayed in a display mode that is different from a display mode of the selected plurality of records.

* * * * *